United States Patent
Suzuki et al.

(10) Patent No.: US 6,754,380 B1
(45) Date of Patent: Jun. 22, 2004

(54) METHOD OF TRAINING MASSIVE TRAINING ARTIFICIAL NEURAL NETWORKS (MTANN) FOR THE DETECTION OF ABNORMALITIES IN MEDICAL IMAGES

(75) Inventors: Kenji Suzuki, Clarendon Hills, IL (US); Kunio Doi, Willowbrook, IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 10/366,482

(22) Filed: Feb. 14, 2003

(51) Int. Cl.[7] .............................................. G06K 9/62
(52) U.S. Cl. ...................... 382/156; 382/157; 382/158
(58) Field of Search ............................... 382/132, 195, 382/276, 288, 295, 156, 157, 158, 103, 224; 706/26, 16; 707/103

(56) References Cited

U.S. PATENT DOCUMENTS 5,799,100 A * 8/1998 Clarke et al. ............... 382/132
5,870,493 A * 2/1999 Vogl et al. .................. 382/195

FOREIGN PATENT DOCUMENTS

| JP | 404200081 A | * | 7/1992 | .......... H04N/5/232 |
| WO | WO02/097714 A1 | * | 12/2002 | .......... G01N/15/14 |

* cited by examiner

Primary Examiner—Anh Hong Do
(74) Attorney, Agent, or Firm—Oblon, Spivak, McClelland, Maier & Neustadt, P.C.

(57) ABSTRACT

A method, system, and computer program product of selecting a set of training images for a massive training artificial neural network (MTANN). The method comprises selecting the set of training images from a set of domain images; training the MTANN with the set of training images; applying a plurality of images from the set of domain images to the trained MTANN to obtain a corresponding plurality of scores; and determining the set of training images based on the plurality of images, the corresponding plurality of scores, and the set of training images. The method is useful for the reduction of false positives in computerized detection of abnormalities in medical images. In particular, the MTAAN can be used for the detection of lung nodules in low-dose CT (LDCT). The MTANN consists of a modified multilayer artificial neural network capable of operating on image data directly.

12 Claims, 18 Drawing Sheets

METHOD OF TRAINING MASSIVE TRAINING ARTIFICIAL NEURAL NETWORKS (MTANN) FOR THE DETECTION OF ABNORMALITIES IN MEDICAL IMAGES

CROSS-REFERENCE TO RELATED APPLICATIONS

The present application is related to U.S. patent application Ser. No. 10/120,420 filed Apr. 12, 2002, the contents of which are incorporated herein by reference.

STATEMENT REGARDING FEDERALLY SPONSORED RESEARCH

The present invention was made in part with U.S. Government support under USPHS Grant Nos. CA62625 and CA83908. The U.S. Government may have certain rights to this invention.

BACKGROUND OF THE INVENTION

1. Field of the Invention

The present invention relates generally to the automated assessment of abnormalities in images, and more particularly to methods, systems, and computer program products for computer-aided detection of abnormalities (such as lesions and lung nodules) in medical images (such as low-dose CT scans) using artificial intelligence techniques, including massive training artificial neural networks, (MTANNs).

The present invention also generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,832,103; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,138,045; 6,141,437; 6,185,320; 6,205,348; 6,240,201; 6,282,305; 6,282,307; 6,317,617; as well as U.S. patent applications Ser. No. 08/173,935; 08/398,307 (PCT Publication WO 96/27846); 08/536,149; 08/900,189; 09/027,468; 09/141,535; 09/471,088; 09/692,218; 09/716,335; 09/759,333; 09/760,854; 09/773,636; 09/816,217; 09/830,562; 09/818,831; 09/842,860; 09/860,574; 60/160,790; 60/176,304; 60/329,322; 09/990,311; 09/990,310; 60/332,005; 60/331,995; and 60/354,523; as well as co-pending U.S. patent applications as well as PCT patent applications PCT/US98/15165; PCT/US98/24933; PCT/US99/03287; PCT/US00/41299; PCT/US01/00680; PCT/US01/01478 and PCT/US01/01479, all of which are incorporated herein by reference.

The present invention includes use of various technologies referenced and described in the above-noted U.S. Patents and Applications, as well as described in the documents identified in the following LIST OF REFERENCES, which are cited throughout the specification by the corresponding reference number in brackets:

LIST OF REFERENCES

1. M. Kaneko, K. Eguchi, H. Ohmatsu, R. Kakinuma, T. Naruke, K. Suemasu, and N. Moriyama, "Peripheral lung cancer: Screening and detection with low-dose spiral CT versus radiography," Radiology, vol. 201, pp. 798–802 (1996).

2. S. Sone, S. Takashima, F. Li, et al., "Mass screening for lung cancer with mobile spiral computed topography scanner," The Lancet, vol. 351, pp. 1242–1245 (1998).

3. C. I. Henschke, D. I. McCauley, D. F. Yankelevitz, et al., "Early Lung Cancer Action Project: Overall design and findings from baseline screening," The Lancet, vol. 354, pp. 99–105 (1999).

4. J. W. Gurney, "Missed lung cancer at CT: Imaging findings in nine patients," Radiology, vol. 199, pp. 117–122 (1996).

5. F. Li, S. Sone, H. Abe, H. MacMahon, S. G. Armato III, and K. Doi, "Lung cancers missed at low-dose helical CT screening in a general population: Comparison of clinical, histopathologic, and image findings," Radiology, vol. 225, pp. 673–683 (2002).

6. S. Yamamoto, I. Tanaka, M. Senda, Y. Tateno, T. Iinuma, T. Matsumoto, and M. Matsumoto, "Image processing for computer-aided diagnosis of lung cancer by CT (LDCT)," Systems and Computers in Japan, vol. 25, pp. 67–80 (1994).

7. T. Okumura, T. Miwa, J. Kako, S. Yamamoto, M. Matsumoto, Y. Tateno, T. Iinuma, and T. Matsumoto, "Image processing for computer-aided diagnosis of lung cancer screening system by CT (LDCT)," Proc. SPIE, vol. 3338, pp. 1314–1322 (1998).

8. W. J. Ryan, J. E. Reed, S. J. Swensen, and J. P. F. Sheedy, "Automatic detection of pulmonary nodules in CT," Proc. of Computer Assisted Radiology, pp. 385–389 (1996).

9. K. Kanazawa, M. Kubo, N. Niki, H. Satoh, H. Ohmatsu, K. Eguchi, and N. Moriyama, "Computer assisted lung cancer diagnosis based on helical images," Image Analysis Applications and Computer Graphics: Proc. of Int. Computer Science Conf., pp. 323–330 (1995).

10. M. L. Giger, K. T. Bae, and H. MacMahon, "Computerized detection of pulmonary nodules in computed tomography images," Investigative Radiology, vol. 29, pp. 459–465 (1994).

11. S. G. Armato III, M. L. Giger, J. T. Blackbur, K. Doi, and H. MacMahon, "Three-dimensional approach to lung nodule detection in helical CT," Proc. of SPIE, vol. 3661, pp. 553–559 (1999).

12. S. G. Armato III, M. L. Giger, C. J. Moran, J. T. Blackbur, K. Doi, and H. MacMahon, "Computerized detection of pulmonary nodules on CT scans," Radiographics, vol. 19, pp. 1303–1311 (1999).

13. S. G. Armato III, M. L. Giger, and H. MacMahon, "Automated detection of lung nodules in CT scans: Preliminary results," Medical Physics, vol. 28, pp. 1552–1561 (2001).

14. S. G. Armato III, F. Li, M. L. Giger, H. MacMahon, S. Sone, and K. Doi, "Lung cancer: Performance of automated lung nodule detection applied to cancers missed in a CT screening program," Radiology, vol. 225, pp. 685–692 (2002).

15. K. Suzuki, S. G. Armato III, F. Li, S. Sone, and K. Doi, "Massive training artificial neural network (MTANN) for reduction of false positives in computerized detection of lung nodules in low-dose CT," (Submitted to) Medical Physics, (2003).

16. K. Suzuki, I. Horiba, N. Sugie, and M. Nanki, "Noise reduction of medical X-ray image sequences using a neural filter with spatiotemporal inputs," Proc. Int. Symp. Noise Reduction for Imaging and Communication Systems, pp. 85–90 (1998).

17. K. Suzuki, I. Horiba, and N. Sugie, "Training under achievement quotient criterion," IEEE Neural Networks for Signal Processing X, pp. 537–546 (2000).

18. K. Suzuki, I. Horiba, and N. Sugie, "Signal-preserving training for neural networks for signal processing," *Proc. of IEEE Int. Symp. Intelligent Signal Processing and Communication Systems*, vol. 1, pp. 292–297 (2000).

19. K. Suzuki, I. Horiba, and N. Sugie, "Designing the optimal structure of a neural Filter," *IEEE Neural Networks for Signal Processing VIII*, pp. 323–332 (1998).

20. K. Suzuki, I. Horiba, and N. Sugie, "A simple neural network pruning algorithm with application to filter synthesis," *Neural Processing Letters*, vol. 13, pp. 43–53 (2001).

21. K. Suzuki, I. Horiba, and N. Sugie, "Simple unit-pruning with gain-changing training," *IEEE Neural Networks for Signal Processing XI*, pp. 153–162 (2001).

22. K. Suzuki, I. Horiba, and N. Sugie, "Efficient approximation of a neural filter for quantum noise removal in X-ray images," *IEEE Transactions on Signal Processing*, vol. 50, pp. 1787–1799 (2002).

23. K. Suzuki, I. Horiba, N. Sugie, and M. Nanki, "Neural filter with selection of input features and its application to image quality improvement of medical image sequences," *IEICE Transactions on Information and Systems*, vol. E85-D, pp. 1710–1718 (2002).

24. K. Suzuki, I. Horiba, and N. Sugie, "Edge detection from noisy images using a neural edge detector," *IEEE Neural Networks for Signal Processing X*, pp. 487–496 (2000)

25. K. Suzuki, I. Horiba, and N. Sugie, "Neural edge detector -a good mimic of conventional one yet robuster against noise-," *Lecture Notes in Computer Science, Bio-Inspired Applications of Connectionism*, vol. 2085, pp. 303–310 (2001).

26. K. Suzuki, I. Horiba, N. Sugie, and M. Nanki, "Extraction of the contours of left ventricular cavity, according with those traced by medical doctors, from left ventriculograms using a neural edge detector," *Proc. of SPIE*, vol. 4322, pp. 1284–1295 (2001).

27. K. Suzuki, I. Horiba, N. Sugie, and M. Nanki, "Contour extraction of the left ventricular cavity from digital subtraction angiograms using a neural edge detector," *Systems and Computers in Japan*, vol. 34, pp. 55–69 (2003).

28. K. Suzuki, I. Horiba, K. Ikegaya, and M. Nanki, "Recognition of coronary arterial stenosis using neural network on DSA system," *Systems and Computers in Japan*, vol. 26, pp. 66–74 (1995).

29. K. Suzuki, I. Horiba, N. Sugie, and M. Nanki, "Computer-aided diagnosis system for coronary artery stenosis using a neural network," *Proc. of SPIE*, vol. 4322, pp. 1771–1782 (2001).

30. D. E. Rumelhart, G. E. Hinton, and R. J. Williams, "Learning representations of back-propagation errors," *Nature*, vol. 323, pp. 533–536 (1986).

31. D. E. Rumelhart, G. E. Hinton, and R. J. Williams, "Learning internal representations by error propagation," vol. 1 of Parallel Distributed Processing, MIT Press, MA, pp. 318–362 (1986).

32. D. P. Chakraborty and L. H. L. Winter, "Free-response methodology: Alternate analysis and a new observer-performance experiment," *Radiology*, vol. 174, pp. 873–881 (1990).

33. K. Funahashi, "On the approximate realization of continuous mappings by neural networks," *Neural Networks*, vol. 2, pp. 183–192 (1989).

34. A. R. Barron, "Universal approximation bounds for superpositions of a sigmoidal function," *IEEE Transactions on Information Theory*, vol. 39, pp. 930–945 (1993).

35. C. E. Metz, "ROC methodology in radiologic imaging," *Invest. Radiology*, vol. 21, pp. 720–733 (1986).

36. C. E. Metz, B. A. Herman, and J.-H. Shen, "Maximum likelihood estimation of receiver operating characteristic (ROC) curves from continuously-distributed data," *Stat. Med.*, vol. 17, pp. 1033–1053 (1998).

The contents of each of these references, including patents and patent applications, are incorporated herein by reference. The techniques disclosed in the patents, patent applications, and other references can be utilized as part of the present invention.

2. Discussion of the Background

Lung cancer continues to rank as the leading cause of cancer deaths among Americans. Screening programs for lung cancer have been carried out with low-dose helical CT (LDCT) [1–3] because early detection of lung cancer allows a more favorable prognosis for the patient. In lung cancer screening, radiologists must read many CT images, resulting possibly in missing some cancers during the interpretation [4][5]. Therefore, computer-aided diagnostic (CAD) schemes for lung nodule detection in LDCT has been investigated as a useful tool for lung cancer screening.

Many investigators have developed CAD schemes for lung nodule detection in CT based on morphological filtering [6][7], geometric modeling [8], fuzzy clustering [9], and gray-level thresholding [10–14]. A major problem with CAD schemes is the large number of false positives, which would cause difficulty in the clinical application of the CAD schemes. Therefore, it is important to reduce the number of false positives as much as possible, while maintaining high sensitivity. Some false-positive reduction techniques have been developed by use of a classifier, such as an artificial neural network (ANN). An ANN usually requires training with a large number of cases, e.g., 500 cases, to achieve adequate performance. If the ANN is trained with a small number of cases, the generalization ability (performance for non-training cases) is lower, i.e., the ANN fits only the training cases, which is known as "over-training."

In the field of image processing, Suzuki et al. have developed a nonlinear filter based on a multilayer ANN called a "neural filter" [16–21] and applied it for reduction of the quantum mottle in X-ray images [22][23]. They developed a supervised edge detector based on a mutilayer ANN, called a "neural edge detector," [24][25] and applied it for detection of Since diagnostic radiology is progressing rapidly with associated technological advances, the timely development of CAD schemes for diagnostic radiology is very important. However, it is very difficult to collect a large number of abnormality training cases, particularly for a CAD scheme for diagnosis with a new modality, such as lung cancer screening with CT. Accordingly, it becomes very difficult to train CAD systems, e.g., artificial neural networks, in these new modalities.

SUMMARY OF THE INVENTION

Accordingly, an object of the present invention is to provide a novel method, system, and computer program product for training a massive training artificial neural network (MTANN) with a very small number of cases.

In addition, an object of the present invention is to provide a novel method, system, and computer program product for training a plurality of MTANNs (a Multi-MTANN) with a very small number of cases.

Another object of the present invention is to provide a novel method, system, and computer program product for training a MTANN to reduce false positives in the computerized detection of abnormalities in medical images.

A further object of the present invention is to provide a novel method, system, and computer program product for training a MTANN to reduce false positives in the computerized detection of lung nodules in LDCT.

These and other objects are achieved according to the invention by providing a novel method, system, and computer program product for selecting an operational set of training images for a massive training artificial neural network (MTANN), the MTANN configured to output an indication of an abnormality in a test image, comprising: (1) selecting a prospective set of training images from a set of domain images; (2) training the MTANN with the prospective set of training images; (3) applying a plurality of images from the set of domain images to the trained MTANN to obtain respective scores for the plurality of images; and (4) determining the operational set of training images based on the applied plurality of images and the respective scores.

According to another aspect of the present invention, there is provided a method, system, and computer program product for selecting a plurality of new training images comprising: (1) determining a set of abnormality images and a corresponding set of abnormality scores from the plurality of images and the respective scores; (2) selecting, from the set of abnormality images, an abnormality image having a minimal score in the corresponding set of abnormality scores; (3) determining a set of non-abnormality images and a corresponding set of non-abnormality scores from the plurality of images and the respective scores, wherein each image in the set of non-abnormality images has a corresponding score greater than the minimal score in the corresponding set of abnormality scores; (4) selecting, from the set of non-abnormality images, a non-abnormality image having a median score in the corresponding set of non-abnormality scores; and (5) selecting the abnormality image and the non-abnormality image as the plurality of new training images.

In addition, according to another embodiment of the present invention, the method of selecting a set of operational training images for a massive training artificial neural network (MTANN) further comprises: (1) calculating a performance measure of the MTANN based on the applied plurality of images and the respective scores; (2) setting the prospective set of training images to be the operational set of training images; and (3) repeating the training, applying, determining, calculating, and setting steps until the performance measure of the MTANN decreases According to another aspect of the present invention, there is provided a method, system, and computer program product for selecting training images for a plurality of MTANNs comprising a Multi-MTANN, wherein each MTANN in the Multi-MTANN is configured to output an indication of an abnormality in the test image and the output of each of the plurality of MTANNs is combined to form a combined indication of the abnormality in the test image, the method comprising: (1) selecting a set of training images for a selected MTANN in the Multi-MTANN using the method described above; (2) training the selected MTANN with the selected set of training images; (3) activating the trained MTANN within the Multi-MTANN; (4) applying a plurality of images from the set of domain images to the Multi-MTANN to obtain respective scores; (5) selecting a second set of training images for a second selected MTANN in the Multi-MTANN based on the applied plurality of images and the respective scores; and (6) repeating the previous training, activating, applying, and selecting steps until a predetermined condition is satisfied.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, in which like reference numerals refer to identical or corresponding parts throughout the several views, and in which.

DETAILED DESCRIPTION OF THE PREFERRED EMBODIMENTS

Figure 1A:
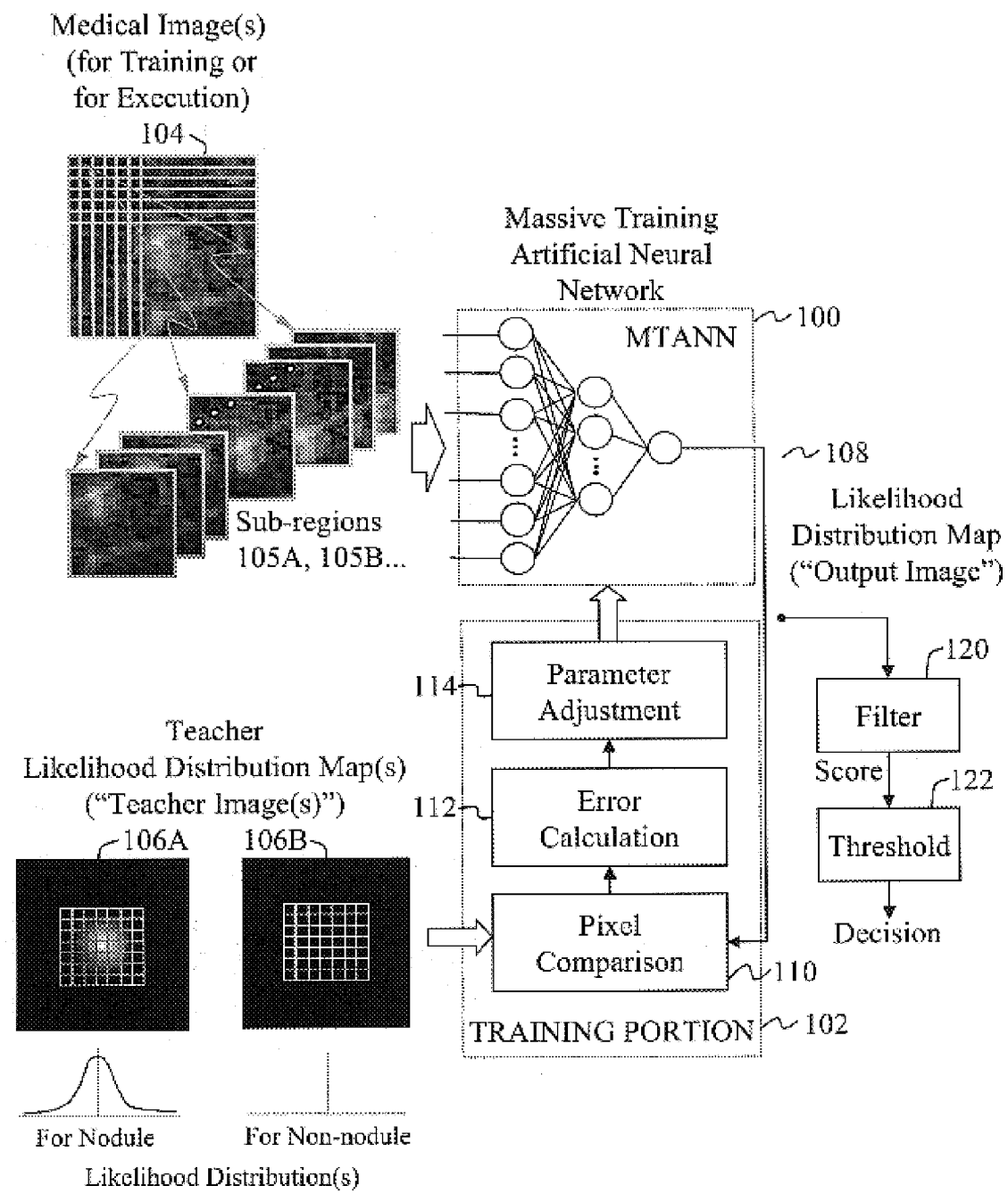
FIG. 1A illustrates an architecture of an exemplary massive training artificial neural network (MTANN) in conjunction with a training portion that trains the network by adjusting network parameters.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Moreover, features and procedures whose implementations are well known to those skilled in the art, such as initiation and testing of loop variables in computer programming loops, are omitted for brevity.

The present invention provides various image-processing and pattern recognition techniques in arrangements that may be called massive training artificial neural networks (MTANNs) and their extension, Multi-MTANNs. The invention is especially useful in reducing false positives in computerized detection of lung nodules in low-dose CT images. A preferred embodiment of the MTANN includes a modified multilayer ANN that can directly handle image pixels.

The exemplary MTANN is trained by use of input images together with the desired teacher images containing a distribution representing the likelihood of a particular pixel being a nodule (lesion). To achieve high performance, the MTANN is trained by using a large number of overlapping sub-regions that are obtained by dividing an original input image. The output image is obtained by scanning an input image with the MTANN: the MTANN acts like a convolution kernel of a filter. A nodule (abnormality) is distinguished from a non-nodule (normal anatomical structure) by a score defined from the output image of the trained MTANN.

FIG. 1A illustrates an architecture of an exemplary massive training artificial neural network (MTANN) 100 in conjunction with a training portion 102 that trains the network by adjusting network parameters. (The training portion is sometimes considered to be part of the network itself.) It is understood that the functions of the elements may be implemented in software on a general purpose computer, as well as in the hardware elements shown in FIG. 1A.

Briefly, during the training phase, sub-regions 105A, 105B . . . of training medical images 104 are input to the MTANN 100 while one or more teacher likelihood distribution maps (loosely called "teacher images") 106A, 106B . . . (collectively, "106") are input to training portion 102. MTANN 100 outputs a likelihood distribution map (loosely called an "output image") 108. In block 110, training portion 102 compares the pixel values of the MTANN's likelihood distribution map 108 to the values of the pixels in teacher likelihood distribution map 106. Block 112 calculates errors between the pixels being compared, and block 114 adjusts MTANN parameter values to minimize the error.

The MTANN is preferably implemented using a three-layer artificial neural network (ANN). The number of layers is preferably at least three, because a two-layer ANN can solve only linear problems. A three-layer ANN structure (including one hidden layer) is a particularly preferred ANN structure because three-layer artificial neural networks can realize any continuous mapping (function). The links connecting the nodes in the artificial neural network need not be of any special design or arrangement; however, the network parameters, the weights or multipliers that characterize the links, are preferably adjusted during a network training phase as described in this specification.

During the operational (execution) phase, medical images 104 are input to the trained MTANN 100, which provides a likelihood distribution map (output image) 108. Filter 120 filters the MTANN's likelihood distribution map 108 to form a score that element 122 compares to a threshold in order to arrive at a decision.

Figure 1B:
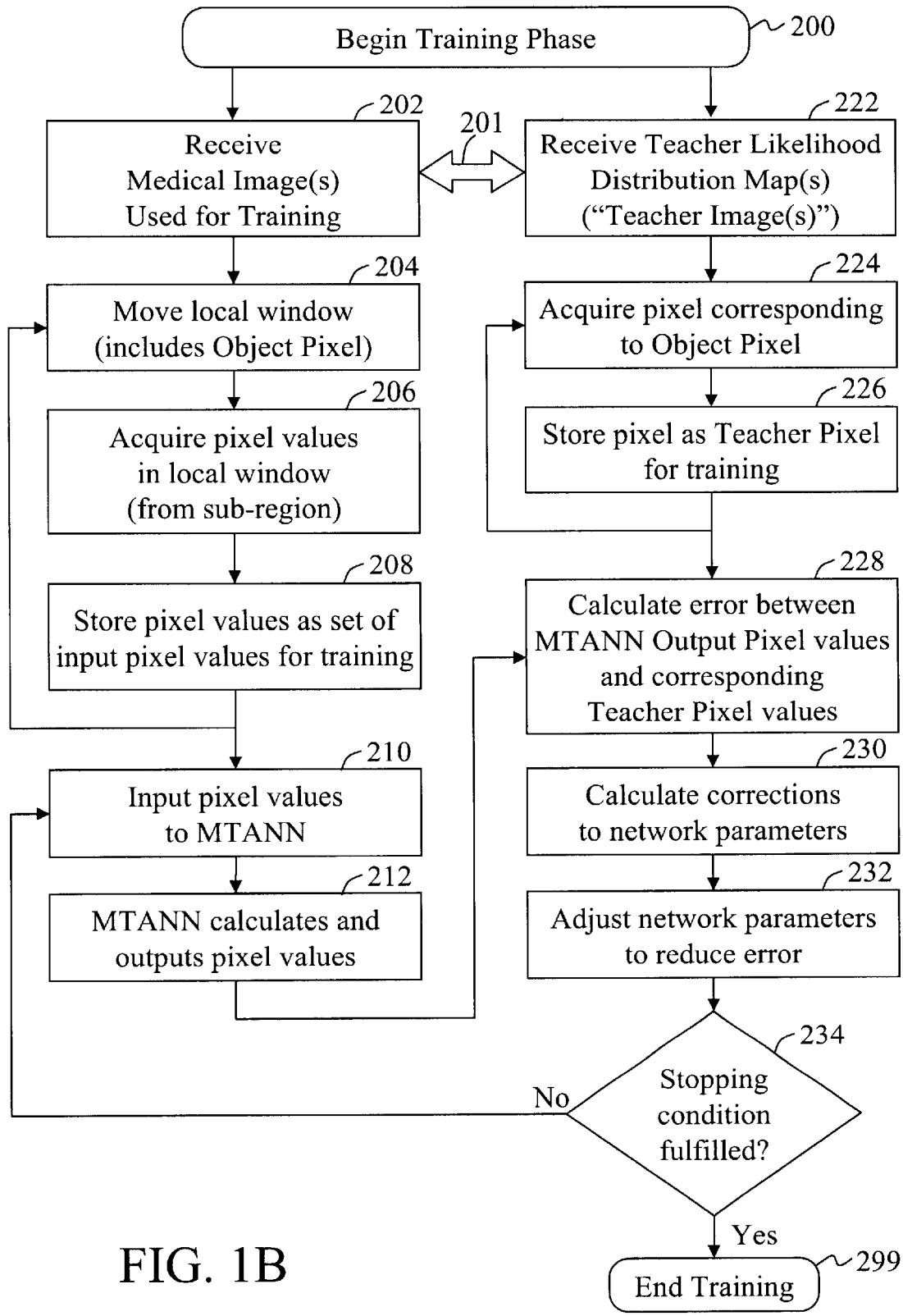
FIGS. 1B and 1C illustrate two flow charts of an MTANN's training phase according to a preferred embodiment of the present invention.
Figure 1C:
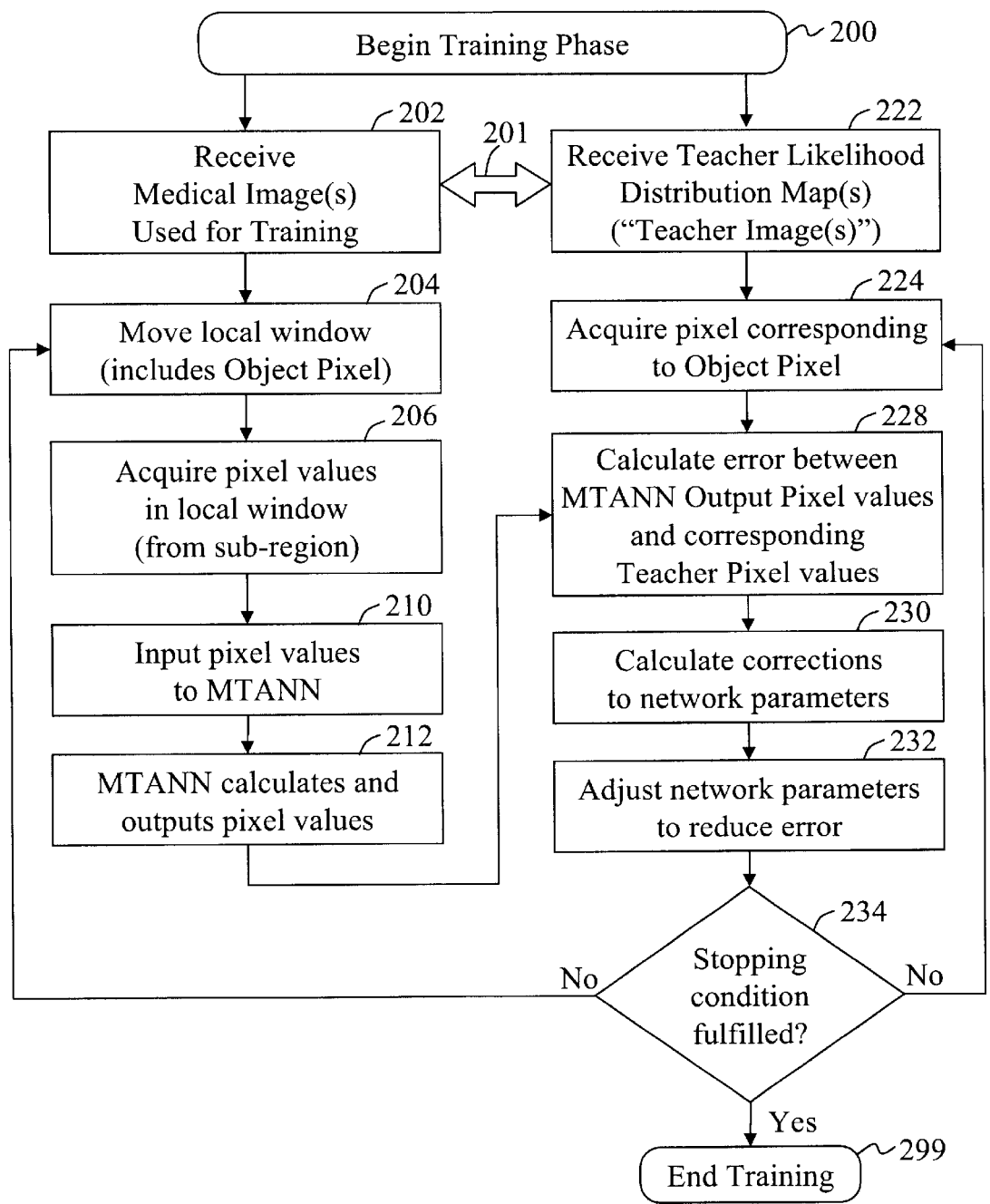
Figure 1D:
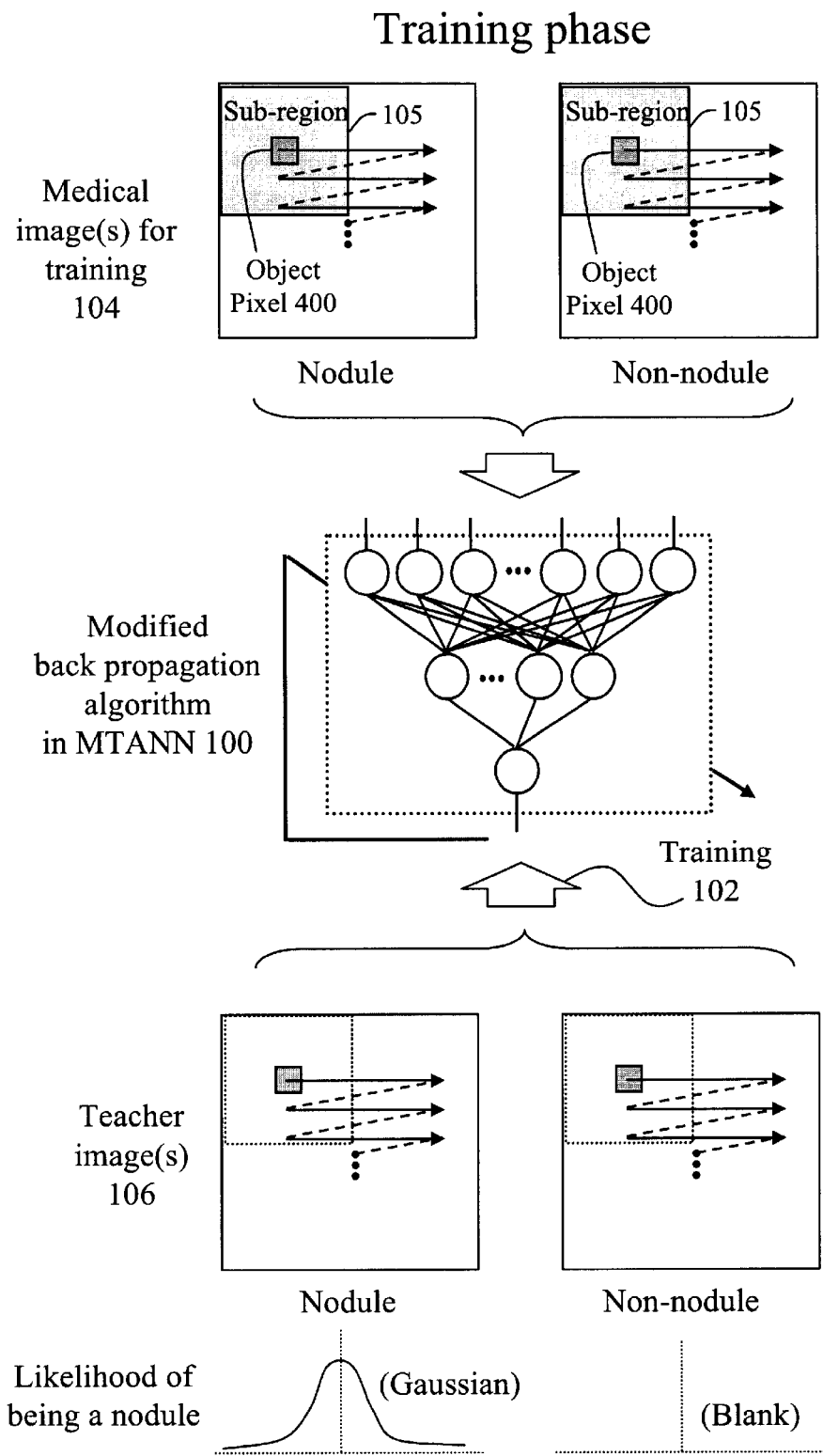
FIG. 1D illustrates a schematic block diagram of an MTANN's training phase, wherein teacher images are "forced" into the outputs of the neural network in order to adjust network parameters.

FIGS. 1B, 1C and 1D illustrate two flow charts and a schematic block diagram of an MTANN's training phase, according to a preferred embodiment of the present invention. The block diagram of FIG. 1D adopts the convention that teacher images are "forced" into the outputs of the neural network to adjust network parameters; more literally the teacher images are input to a training portion 102 (see FIG. 1A, element 102) that for simplicity is not illustrated in FIG. 1D.

Figure 1E:
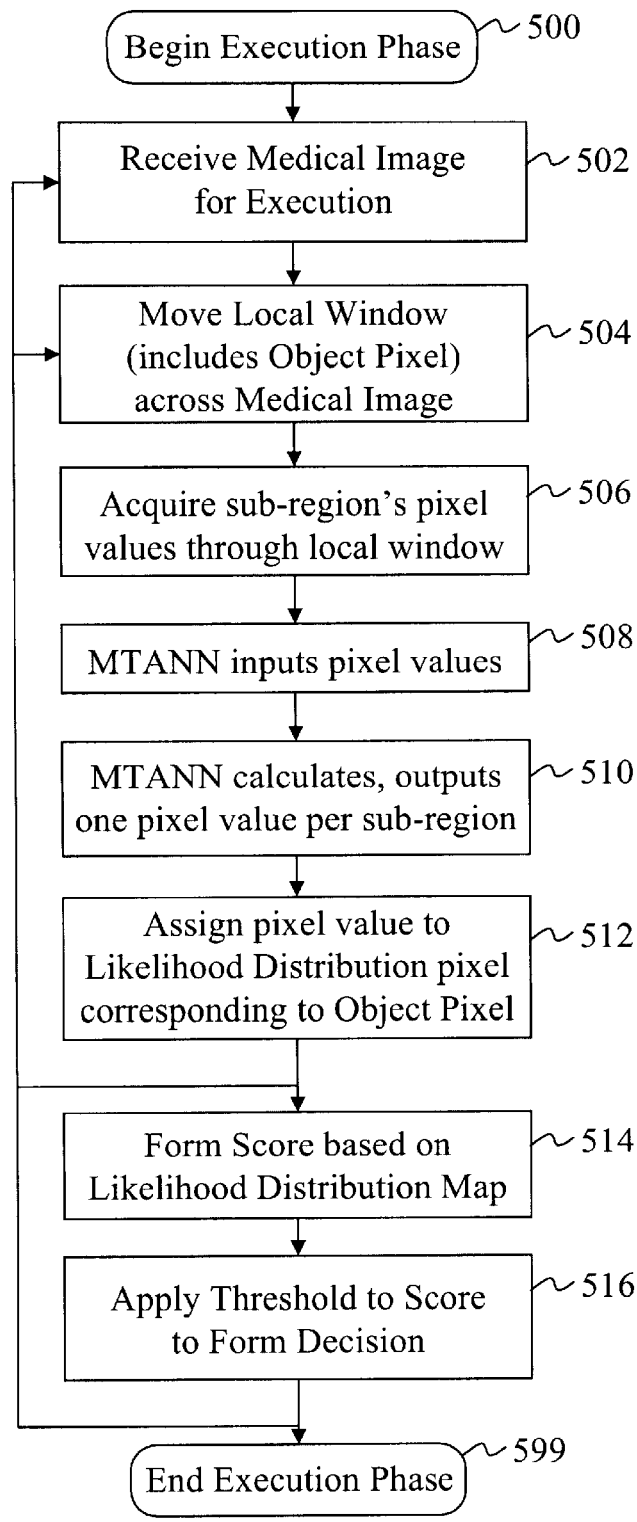
FIG. 1E illustrates the steps in a method of an MTANN's execution (operational) phase according to a preferred embodiment of the present invention.
Figure 1F:
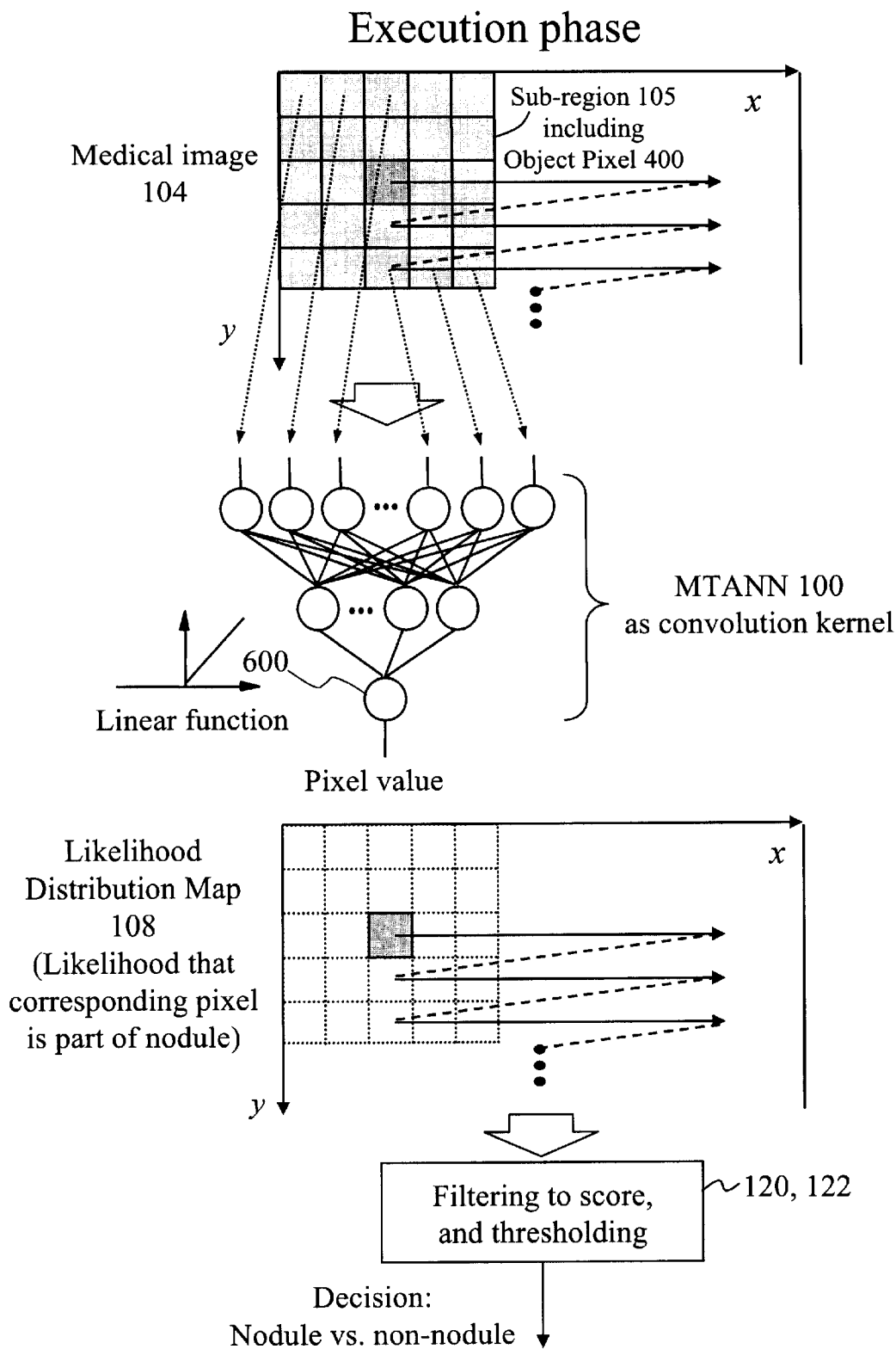
FIG. 1F illustrates a schematic block diagram of an MTANN's execution (operational) phase according to a preferred embodiment of the present invention.

As briefly described above, MTANN 100 involves a training phase and an execution (or operational) phase. FIG. 1A illustrates elements that are used in either or both phases, with the understanding that elements and steps used in one phase need not necessarily be present or executed in the other phase. For example, the training portion 102 may be omitted from products that have already been trained and are merely desired to be used operationally (FIGS. 1E, 1F). Conversely, filter 120 and threshold element 122 are not involved in the training phase (FIGS. 1B, 1C, 1D), but are discussed with reference to the execution (operational) phase.

Referring to the FIG. 1B flow chart in conjunction with the FIG. 1A block diagram, during a training phase, pixels from training medical images 104 are received in step 502. A given training medical image 104 may include an abnormality, no abnormalities, or set of both abnormalities and normal structures that are desired to be distinguished from abnormalities. The pixels of the training medical image are input to the MTANN in accordance with steps 204 through 208.

In step 204, a local window begins to scan across the training medical image. In step 204, the local window moves from one sub-region 105 (see FIG. 1D) of the training medical image to another, preferably one pixel distance at a time. A set of pixel values in the sub-region currently in the local window are acquired in step 206, and are stored in step 208. In the loop including steps 204 through 208, the local window scans across the rows of the training medical image in a manner shown in FIG. 1D.

Sets of input pixel values that were stored in the loop 204–208 are then input to the MTANN in step 210, which calculates pixel values (step 212) in accordance with network parameters. Network parameters include, for example, multipliers in the links between neural network nodes. The calculated pixel values are output from the MTANN as an MTANN likelihood distribution map 108 (FIG. 1A).

The MTANN likelihood distribution map's pixels are calculated to be a likelihood that a corresponding "object pixel" 400 (see FIG. 1D) from the training medical image is part of an abnormality. The likelihood distribution map may be loosely referred to as an "output image" even though it is not strictly an image in the sense of a photograph of a structure. The description of the likelihood distribution map as an "image" is valid, inasmuch as its pixel values may be represented graphically to emphasize which parts of the original training medical image are abnormal and which parts are normal. For example, pixels that are more likely part of abnormalities can be made brighter and pixels that are less likely to be abnormalities can be made darker.

Referring again to FIG. 1B, step 222 illustrates the reception of one or more teacher likelihood distribution maps (also called "teacher images"). As shown by broad bi-directional arrow 201, the teacher likelihood distribution maps 106 should correspond to the training medical images 104 discussed above, because the training process involves a progressively finer tuning of MTANN network parameters so that the MTANN 100 reliably recognizes the abnormalities that are known to exist in the training medical images.

In a preferred embodiment, training portion 102 receives a first teacher likelihood distribution map 106A (FIG. 1A) showing a distribution of pixel intensities representing the likelihood that that particular pixel is part of an abnormality. In a particular preferred embodiment, that distribution is likely to follow a two-dimensional Gaussian distribution pattern, preferably with a standard deviation proportional to a size of the abnormality. Further, training portion 102 receives a second teacher likelihood distribution map 106B (FIG. 1A) that is "blank" or "black," representing a distribution of pixel intensities when that particular pixel is not part of an abnormality.

In FIG. 1B, the training portion iteratively acquires a pixel from the teacher likelihood distribution map(s) 106 that corresponds to a object pixel in the training medical image (step 224) and stores that pixel as a teacher pixel in preparation for a pixel comparison (step 226).

Step 228 involves comparison of pixel value differences (error) between (A) the likelihood distribution map 108 output by the MTANN in response to the training medical image 104, and (B) the teacher likelihood distribution map 106. This step is performed by comparison and error calculation blocks 110, 112 in training portion 102 of FIG. 1A.

Step 230 shows the calculation of corrections to the MTANN's existing network parameters in order to minimize an error between the MTANN's output and the teacher map. Step 232 shows the application of the corrections to the existing network parameters so as to form adjusted network parameters. These two steps are performed by parameter adjustment block 114 in training portion 201 of FIG. 1A.

Decision block 234 determines if a stopping condition for the training phase has been fulfilled. The stopping condition may involve a counting of a certain number of iterations of the training loop with respective medical images and teacher likelihood distribution maps. Alternatively, the stopping condition can involve stopping the training when error adjustments have been reduced to beneath a certain threshold, indicating that further training is unnecessary or even counter-productive.

If the stopping condition is not fulfilled, control returns to step 210 so that further sets of pixel values can be input to the MTANN. If the stopping condition is fulfilled, the training phase is ended (block 299), after which time the execution phase of FIGS. 1E and 1F may begin.

The flowchart of FIG. 1C illustrates an alternative embodiment of the training method shown in FIG. 1B. The two methods differ in whether the MTANN processes a set of medical image pixels after an entire set is stored (FIG. 1B), or whether the MTANN processes the medical image pixels "on the fly" (FIG. 1C).

FIG. 1C avoids the need for FIG. 1B's storage steps 208, 226. FIG. 1C also avoids FIG. 1B's "tight" iterative loops 204/206/208 and 224/226. Instead, FIG. 1C executes a "wider" pair of loops "204/206/210/212 + 228/230/232" and "224 + 228/230/232." Otherwise, the steps that are common to the two training methods are essentially the same, and discussion of the common steps is not repeated.

Turning now to a description of the execution (operational) phase, the training portion 102 (FIG. 1A) is not active, or even not present. Also, the medical images 104 that are input to MTANN 100 are not training medical images with known and verified abnormalities, but generally are "new" medical images that have not been used to previously train the MTANN. However, filter element 120 and threshold element 122 are used during the execution phase.

FIGS. 1E and 1F illustrate a flow chart and a schematic block diagram of an MTANN's execution (operational) phase, according to a preferred embodiment of the present invention.

Referring to the execution phase flow chart of FIG. 1E, step 502 shows the reception of a medical image 104 for input to the MTANN 100. It is generally not known in advance whether structures in the medical image for execution contain abnormalities or merely normal structures.

A loop including steps 504, 506, 508, 510 and 512 correspond generally to steps 204, 206, 208, 210, and 212 of the training phase (FIG. 1B), except that the medical image that is being operated on is not a training medical image.

In FIG. 1E, step 504 illustrates the moving of a local window from one sub-region of the medical image to a subsequent sub-region. The sub-regions have respective "object pixels" 400 shown in FIGS. 1D and 1F. Step 506 shows how sets of pixels from a present sub-region are acquired through the local window, and step 508 represents the input of those pixel sets to the MTANN. Step 510 shows that the MTANN calculates an output pixel value for each window location (sub-region), with step 512 assigning that pixel value to an output pixel location in an output likelihood distribution map that corresponds to the object pixel for that sub-region. The loop of steps 504 through 512 is repeated, with the local window iteratively moving from sub-region to sub-region, preferably one pixel's distance at a time, as shown in FIG. 1F.

When the loop has been completed, the entire medical image (or all that is desired to be scanned) has been scanned. Control passes to step 514, which indicates how a filter 120 (FIG. 1A) filters the MTANN's likelihood distribution map 108 to arrive at a score. Finally, threshold block 122 compares a threshold value to the score to arrive at a decision concerning the detection of an abnormality in the medical image, as illustrated by step 516.

The foregoing procedure may be repeated for each medical image (or plural portions of a same medical image), as indicated by the return path from step 516 to step 502. When there is no more medical image information to be analyzed, the execution phase is completed (block 599).

The exemplary MTANN includes a modified multilayer ANN that can directly handle input gray levels and output gray levels. This embodiment is in contrast to many conventional ANNs, which commonly input image discretely-valued features as distinguished from continuous-valued image pixels. Many conventional ANNs are usually employed as a classifier that handles classes as distinguished from the gray levels that are handled by the inventive MTANN. Of course, the invention should not be limited to levels that are "gray" in the sense of being a shade between black and white; use of color pixels also lies within the contemplation of the present invention.

In the exemplary embodiment of the MTANN described herein, image processing or pattern recognition is treated as the convolution on an image with the modified ANN in which the activation functions of the units in the input, hidden, and output layers are a linear function, a sigmoid function, and a linear function, respectively.

In a particular preferred embodiment, the activation function of output layer 600 (FIG. 1F) is a linear function, as distinguished from step functions, the sign function or sigmoid functions. The choice of a linear function in the output layer comports with the feature of the invention, that the output of the artificial neural network is not a binary decision, class, diagnosis, or other discrete-value conclusion, but may constitute a continuous-value element such as a picture element of arbitrarily fine precision and resolution. Here, continuous-value means essentially means that a pixel may take on any of a variety of values so that a pixel is for practical purposes represented as an analog entity, even though it is recognized that digital computers have a finite number of bits allocated to represent entities such as pixels.

In a particular preferred embodiment analyzing low-dose CT scans and corresponding output images, a pixel is represented by 12 bits representing a gray scale tone. However, other degrees of precision and resolution, and multi-dimensional pixels such as color pixels, are also contemplated by the invention.

In contrast to the described embodiment, the activation function of output layer units of conventional ANNs is commonly a sigmoid function. However, a preferred embodiment of the invention employs a linear output unit activation function instead of a sigmoid function one because the characteristics of ANN are significantly improved in the application to the continuous mapping issues dealing with continuous values in image processing, for example.

The basic architecture and operation of the embodiments of the MTANN having been described above, the following discussion provides more detail concerning the MTANN and certain explanations of its design. Of course, the scope of the claims should not be limited by particular applications of the invention or demonstrations of its success.

The pixel values of the original images are normalized first. The pixel values in a local window $R_s$ are input to the MTANN: the inputs to the MTANN are a normalized pixel value g(x, y) of an original image and spatially adjacent normalized pixel values. Although the most common use of a multilayer ANN is as a classifier that determines whether a certain pixel belongs to the class, such as normal or abnormal, the output of the MTANN is not a class, but a continuous value, which corresponds to the object pixel (for example, center pixel) in the local window, represented by $$f(x,y) = NN\{I(x,y)\} = NN\{g(x-i, y-j) | i,j \in R_s\} \quad (1)$$

where:

f (x, y) denotes the estimate for the desired teacher value,
x and y are the indices of coordinates,
NN{·} is the output of the modified multilayer ANN, I (x, y) is the input vector to the modified multilayer ANN,
g(x, y) is the normalized pixel value, and
$R_s$ is the local window of the modified multilayer ANN.

In a preferred embodiment, only one unit is employed in the output layer. The desired teacher values and thus the outputs of the MTANN are changed according to the application; when the task is distinguishing nodules from non-nodules, the output represents the likelihood that a given output pixel is part of a nodule.

All pixels in an image may be input by scanning the entire image with the MTANN. The MTANN, therefore, functions like a convolution kernel of a filter. In a particular preferred embodiment, the local window of the MTANN is shifted one pixel's distance at a time to cover successive sub-regions of the input image.

The MTANN is trained so that the input images are converted to the desired teacher images. The MTANN may be trained in the following manner.

In order to learn the relationship between the input image and the desired teacher image, the MTANN is trained with a set of input images and the desired teacher images by changing of the weights between the layers. The error E to be minimized by training is defined by:

$$E = \frac{1}{2P} \sum_p \{T^{(p)} - f^{(p)}\}^2 \quad (2)$$

where:

p is a training pixel number,
$T^{(p)}$ is the p-th training pixel in the teacher images,
$f^{(p)}$ is the p-th training pixel in the output images, and
P is the number of training pixels.

The MTANN may be trained by any suitable technique known to those in the art. In one embodiment, a modified back-propagation algorithm may be derived for the arrangement described above, in the same way as the standard back-propagation algorithm [31]. In this embodiment, the weight correction ΔW of the weight W between the m-th unit in the hidden layer and the unit in the output layer O is represented by:

$$\Delta W_m^O = -\eta \cdot \delta \cdot O_m^H = -\eta (T-f) O_m^H \quad (3)$$

where:

δ is a delta value that may be computed by:

$$\delta = \frac{\partial E}{\partial X} = \frac{\partial E}{\partial f_L} \frac{\partial f_L}{\partial X}$$

$f_L$ is an activation function of the unit in the output layer (according to the preferred embodiment of the invention, preferably a linear function),
X is the input value to the activation function,
η is the learning rate, and
$O_m^H$ denotes the output (O) of the m-th unit in the hidden (H) layer.

By use of the delta, the corrections of any weights can be derived in the same way as the derivation of the back-propagation algorithm.

For distinguishing between nodules and non-nodules, the desired teacher image contains a distribution representing the likelihood of being a nodule. That is, a teacher image for nodules should contain a certain distribution, the peak of which is located at the center of the nodule; and that for non-nodules should contain zero. As the distance increases from the center of the nodule, the likelihood of being a nodule decreases; therefore, a two-dimensional Gaussian function with standard deviation $\sigma_T$ at the center of the nodule is used as the distribution representing the likelihood of being a nodule, where $\sigma_T$ may be determined as a measure representing the size of a nodule.

FIG. 1A illustrates the training for one nodule image. First, the image displaying a nodule at the center is divided into a large number of overlapping sub-regions. The consecutively adjacent sub-regions in the input image differ just by a pixel's separation distance. In other words, a sub-region overlaps with and differs by one pixel's separation distance from four adjacent sub-regions. The size of the sub-region corresponds to that of the local window $R_s$ of the MTANN.

All pixel values in each of the sub-regions are input to the MTANN. However, only one pixel in the teacher image is selected at the location in proportion to the displacement (or shift) of the central pixel in the input sub-region, and is entered into the output unit in the MTANN as the teacher value. By presenting each of the input sub-regions together with each of the teacher values, the MTANN is trained. The training set {I}, { T} for each nodule or non-nodule image may be represented by the following equations:

$$\{I_{s1}, I_{s2}, \ldots, I_{sp}, \ldots, I_{sNT}\} = \{I_s(x-i, y-j) | i, j \in R_T\} \{T_{s1}, T_{s2}, \ldots, T_{sp}, \ldots, T_{sNT}\} = \{T_s(x-i, y-i) | i, j \in R_T\} \quad (4)$$

where:

s is the image (case) number, $R_T$ is the training region, $N_T$ is the number of pixels in $R_T$, and $T_s(x, y)$ is the teacher image.

Thus, a large number of input sub-regions overlap each other, and the corresponding teacher values in the teacher image are used for training. The MTANN is trained with massive training samples to achieve high generalization ability.

The MTANN is robust against variation in patterns, especially shifting of patterns, because it is trained with numerous shifted patterns. The MTANN learns the essential features for nodules without the dependence on shifted locations.

After training, the MTANN outputs the highest value when a nodule is located at the center of the input region of the MTANN, a lower value as the distance increases from the center, and zero when the input region is a non-nodule.

The preferred embodiment of the output filter forms a score in the following manner.

When an original image for the $s^{th}$ case is entered into the trained MTANN for testing, the output image for the $s^{th}$ case is obtained by scanning of the original image with the trained MTANN. A nodule is distinguished from a non-nodule by a score S defined from the output image of the trained MTANN:

$$S_s = \sum_{x,y \in R_E} f_G(\sigma; x, y) \times f_s(x, y) \quad (5)$$

where:

$S_s$ is the score for the $s^{th}$ case, $R_E$ is the region for evaluation, $f_s(x, y)$ is the output image for the $s^{th}$ case, x is arithmetic multiplication, and $f_G(\sigma; x, y)$ is a two-dimensional Gaussian function with standard deviation $\sigma$.

This score represents the weighted sum of the estimate for the likelihood of being a nodule near the center, i.e., a higher score indicates a nodule, and a lower score indicates a non-nodule. Other methods for determining a score can be employed. For example, the score may be calculated by averaging pixel values in the region $R_E$ in the output image of the MTANN.

In another embodiment of the present invention, a multiple massive training artificial neural network (Multi-MTANN) includes plural units of the MTANN described above.

A single MTANN is effective for distinguishing between nodules and peripheral and medium-size vessels. However, other non-nodules, such as large vessels in the hilum, soft-tissue opacities caused by the diaphragm or the heart, parts of normal structures, and some other abnormal opacities, prove more problematic. Compared to the Multi-MTANN, it is difficult for a single MTANN to distinguish between nodules and various such types of non-nodules because the capability of a single MTANN is limited compared to the Multi-MTANN.

Figure 10:
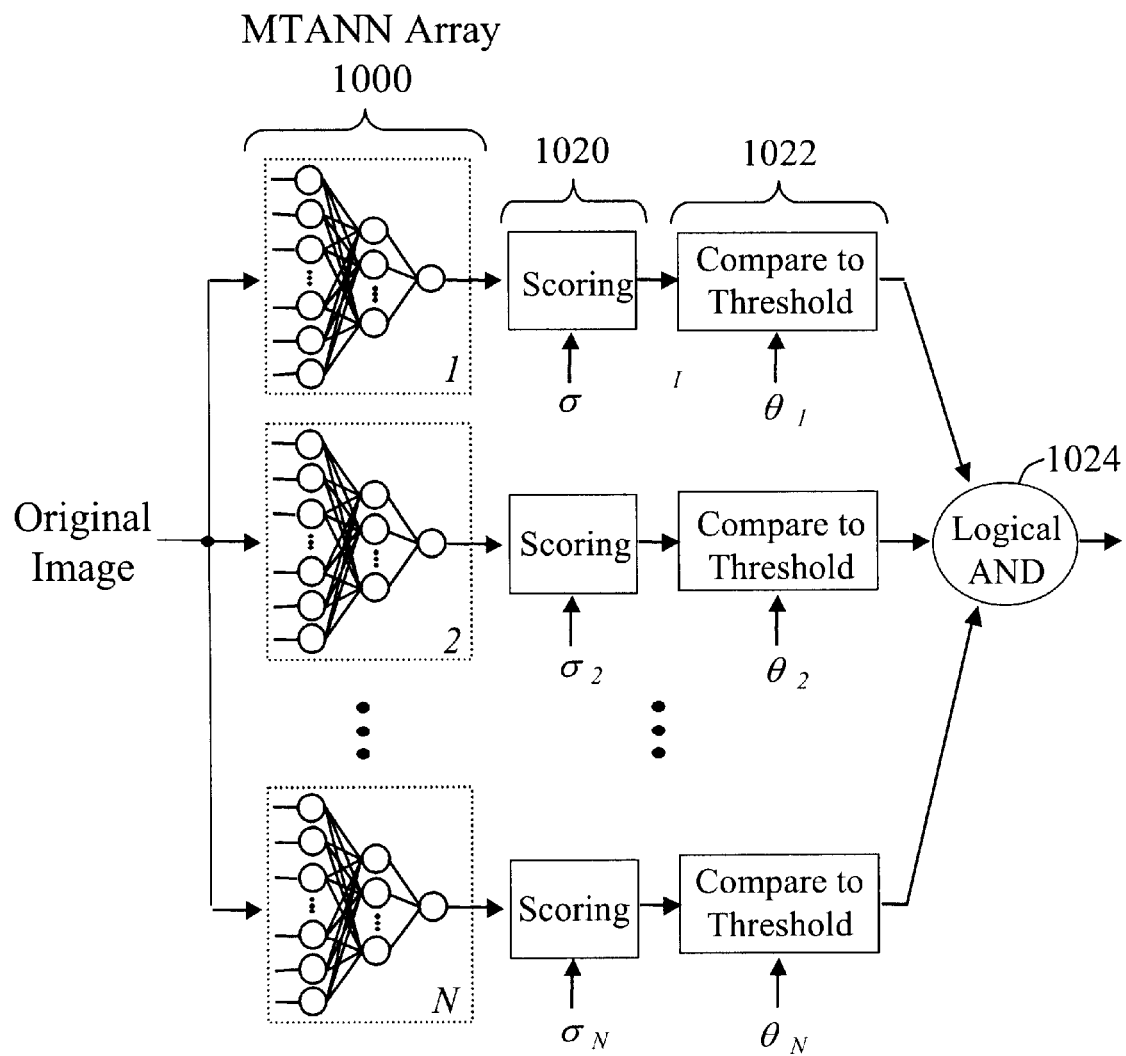
FIG. 10 is a schematic block diagram illustrating an exemplary architecture of a multiple massive training artificial neural network (Multi-MTANN), in which each MTANN is trained using a different type of non-nodule, but with the same nodules so that each MTANN acts as an expert for distinguishing nodules from a specific type of non nodule.

In order to distinguish between nodules and various types of non-nodules, the Multi-MTANN extends the capability of a single MTANN. The architecture of an exemplary Multi-MTANN is shown in FIG. 10.

The illustrated exemplary Multi-MTANN includes plural (here, N) MTANNs arranged in parallel in an MTANN array 1000. In a preferred embodiment, each MTANN is trained by using a different type of normal anatomical structure (sometimes referred to herein a non-lesion or a non-nodule), but with the same abnormality (lesion or nodule). Each MTANN acts as an expert for distinguishing between abnormalities (nodules) and its specific type of normal anatomical structure (non-nodule). For example, a first MTANN may be trained to distinguish nodules from medium-size vessels; a second MTANN may be trained to distinguish nodules from soft-tissue opacities caused by the diaphragm; and so on. Various normal structures that may be distinguished include: large vessels in the hilum, large vessels with opacities, medium-sized vessels, small vessels, soft-tissue opacities caused by a heart, soft-tissue opacities caused by a diaphragm, soft-tissue opacities caused by a partial volume effect between peripheral vessels and the diaphragm, abnormal opacities, focal infiltrative opacities, and other normal anatomical structures.

At the output of the MTANNs are respective filters in a filter array 1020 that perform a scoring function on the likelihood distribution maps (output images) that are provided by the MTANNs. The filters in filter array 1020 correspond generally to MTANN filter 120 (FIG. 1A). In a preferred embodiment, the same scoring method may be applied to the output of each MTANN.

At the output of the filter/scoring element array 1020 is a threshold element array 1022 whose individual elements correspond generally to threshold element 122 (FIG. 1A). Thresholding of the score for each MTANN is performed to distinguish between a nodule and the type of non-nodule that is specific to that MTANN. The threshold elements in array 1022 arrive at N respective decisions concerning the presence of an abnormality.

The performance of the N MTANNs is then merged or integrated, for example, by a logical AND operation, shown in FIG. 10 by a logical AND operator 1024. Because each MTANN expertly eliminates a specific respective type of non-nodule with which that particular MTANN is trained, the multi-MTANN eliminates a larger number of false positives than does any single MTANN. The operation of the logical AND element depends on the training of the various MTANNs.

The Multi-MTANN may be trained in the following manner. In a preferred embodiment, each MTANN is trained independently by a same abnormality (nodule) but with different normal structures (non-nodules).

First, the false positives (non-nodules) reported by the CAD scheme for lung nodule detection in CT are classified into a number of groups. The number of groups may be determined by the number of obviously different kinds of false positives.

In a preferred embodiment, typical non-nodules in each group are selected as training cases for a particular respective MTANN, whereas typical nodules are selected as training cases for all MTANNs. The original images of nodule candidates are used as the input images for training. The teacher image is designed to contain the distribution for the likelihood of being a nodule, i.e., the teacher image for nodules contains a two-dimensional Gaussian distribution with standard deviation $\sigma_T$; and that for non-nodules contains zero (−1000 HU (Hounsfield units)).

Each MTANN is trained by a modified back-propagation algorithm with training cases. Then, the input images and the desired teacher image are used to train each MTANN in the same way as a single MTANN is trained. The MTANN acts as an expert for the specific type of non-nodules after training.

The outputs of the MTANNs may be scored as follows. The output from each trained MTANN is scored independently. The score $S_{n,s}$ for the $n^{th}$ trained MTANN is defined as:

$$S_{n,s} = \sum_{x,y \in R_E} f_G(\sigma_n; x, y) \times f_{n,s}(x, y) \quad (6)$$

where:

$R_E$ is the region for evaluation, $f_{n,s}(x, y)$ is $s^{th}$ output image (case) of the $n^{th}$ MTANN, x is arithmetic multiplication, and $f_G(\sigma_n; x, y)$ is a two-dimensional Gaussian function with standard deviation $\sigma_n$.

The parameter $\sigma_n$ may be determined by the output images of the trained MTANN with training cases. Distinguishing between nodules and the specific type of non-nodules is performed by thresholding of the score with a threshold $\theta_n$ for the n-th trained MTANN.

The distinctions of the expert MTANNs are combined by use of a logical AND operation such that each of the trained MTANNs maintains the detection of all nodules, but removes some of the specific type of non-nodules, and thus various types of non-nodules can be eliminated.

The invention envisions that the logical AND function may be performed in at least two ways. First, a logical AND combiner may provide an indication of an abnormality (lesion or nodule), only if all the individual MTANNs indicate an abnormality. Alternatively, the logical AND combiner may provide an indication of no abnormality (no lesion or no nodule), only if all the individual MTANNs indicate no abnormality.

The first embodiment of the logical AND combiner, in which the AND function indicates an abnormality only when all MTANNs indicate an abnormality, is preferred in most circumstances. However, this preference depends on the training of the individual MTANNs: the first embodiment is preferred when the MTANNs are trained with different non-lesions but with the same lesions. However, when the MTANNs are trained with different lesions but with the same non-lesions, the alternative realization of the AND function is appropriate.

Usually, the variation among abnormalities (lesions, nodules) is small, and the variation among normal structures is large, so that the first embodiment is generally preferred. However, in many applications, such as when the abnormalities are interstitial opacities, the alternative embodiment is preferred. The choice of implementations of the AND function is based on the anatomical structures involved and the corresponding MTANN training.

As an alternative to the embodiment shown in FIG. 10, it is possible to form a "merged image" by adding all the individual MTANNs' images, and then apply scoring/filtering and thresholding to the single merged image. However, the performance of the FIG. 10 embodiment is superior to that of the alternative embodiment. If the performances are combined by a linear operation such as pixel addition, performance is not as high. An important advantage of the FIG. 10 embodiment is to combine the different performances of the MTANNs by thresholding with different threshold values tailored to each performance.

Sequential Training Method and System

Figure 2A:
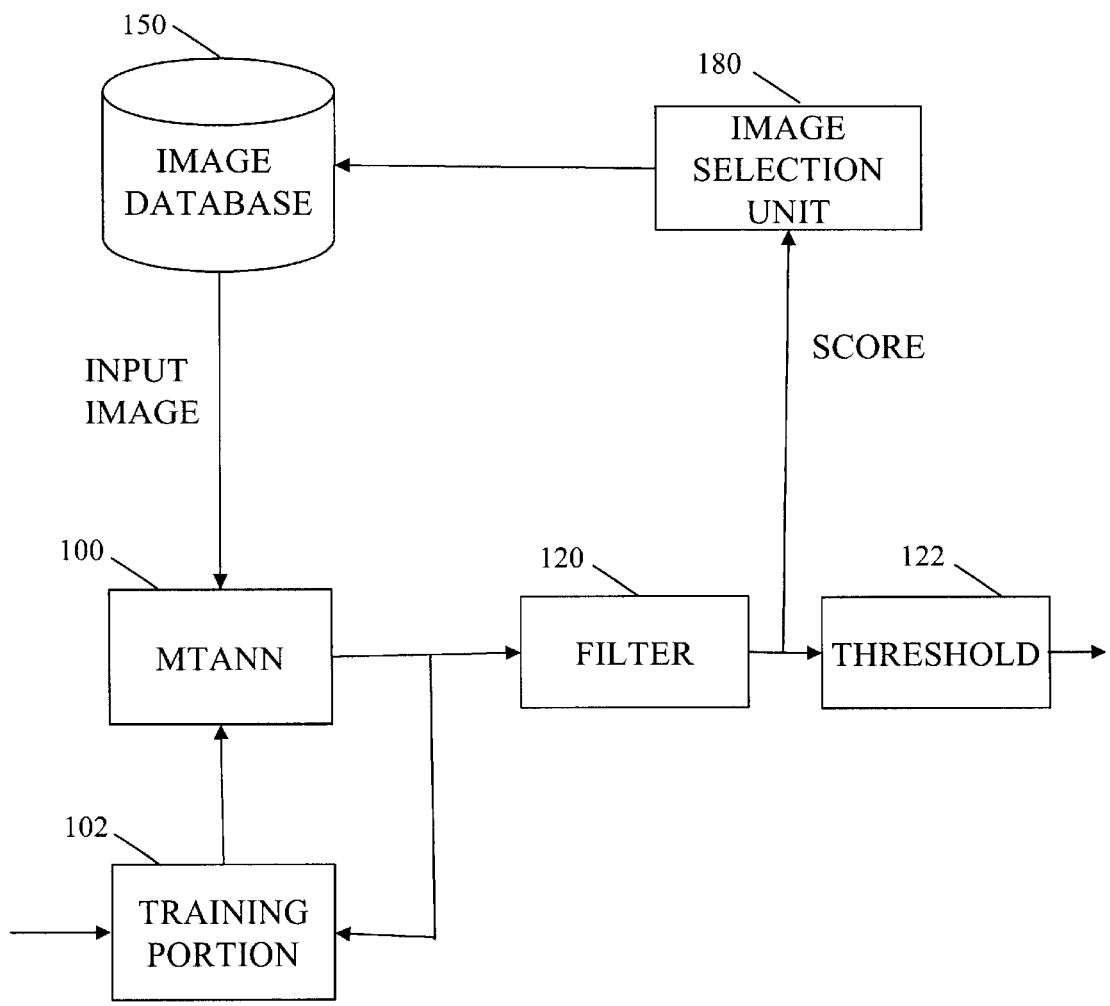
FIG. 2A illustrates the system of selecting a set of training images for a MTANN according to the present invention.

FIG. 2A illustrates the system for selecting a set of training images for a MTANN according to the present invention. Note that the functions of the MTANN 100, training portion 102, filter 120, and threshold 122 have been described above with regard to FIGS. 1A–1C. In the present invention, training images are selected by the image selection unit 180 from the image database 150 based on an evaluation of the performance of the MTANN 100, as will be described below in connection with FIGS. 2B–2D.

Figure 2B:
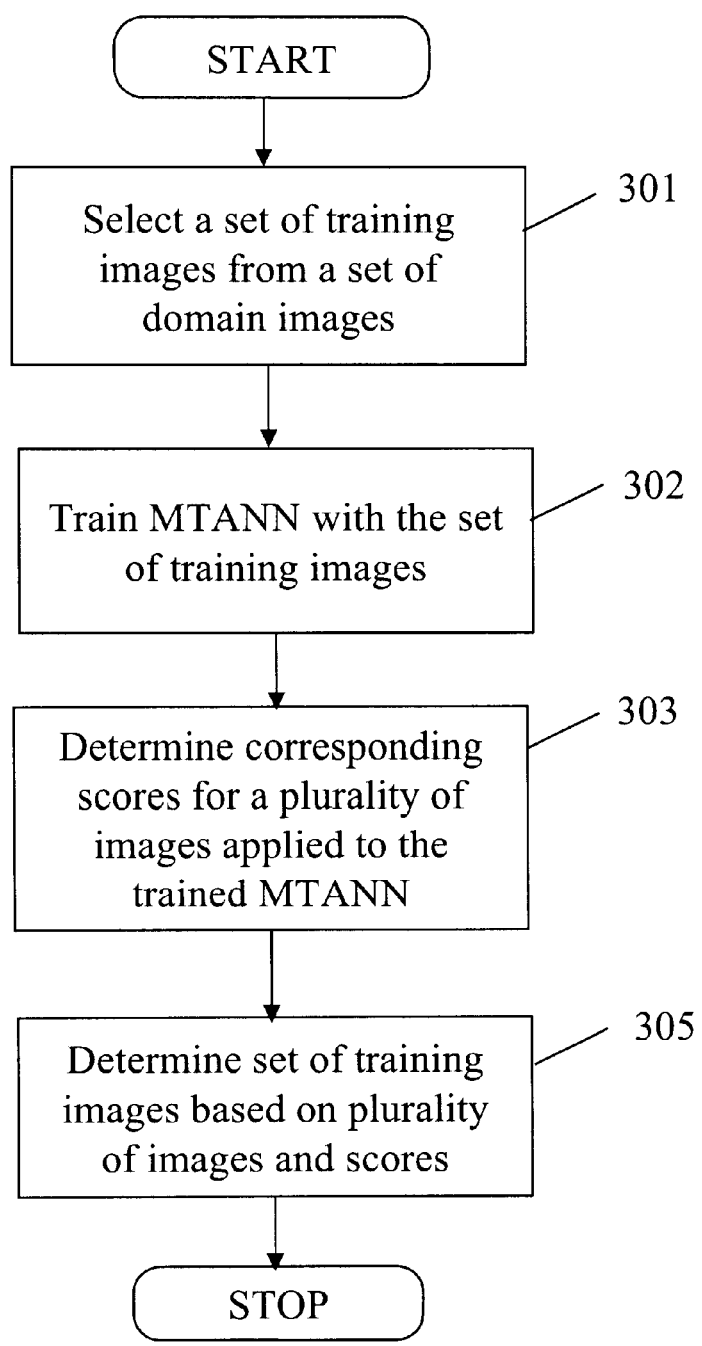
FIGS. 2B and 2C illustrate the method of selecting a set of training images for a MTANN according to the present invention.

FIG. 2B illustrates a method of training an MTANN according to the present invention. Training samples for the MTANN are selected sequentially, i.e., a pair of a nodule and a non-nodule is added one by one in the training samples. Training with each set of training samples is performed independently.

First, in step 301, a seed pair of an abnormality image (e.g., containing a nodule) and a non-abnormality image (e.g., not containing a nodule), is selected from typical abnormality images and typical non-abnormality images in the image database 150.

In step 302, the MTANN is trained with the seed pair of training images using methods previously described with regard to FIGS. 1A–1C.

Next, in step 303, scores for nodule candidate (non-training) images are calculated by use of the output images of the trained MTANN. The performance of the trained MTANN is evaluated by use of a free-response receiver operating characteristic (FROC) curve [32] for non-training cases.

In step 305, based on the FROC curve for non-training cases, a second pair of a nodule and a non-nodule is selected. The nodule with the lowest score of all nodules is selected as the second training nodule; the non-nodule with the middle ranking in the scores for all remaining non-nodules at a classification sensitivity of 100% is selected. The selected nodule corresponds to a point where the classification sensitivity decreases first in the FROC curve. The selected non-nodule corresponds to a middle point between the lowest false-positive rate at a classification sensitivity of 100% and the lowest false-positive rate at the lowest classification sensitivity in the FROC curve.

Alternatively, in step 305, a histogram of the scores obtained with each non-training image may be created. In the application of MTANN to false positives (non-nodules) reduction, it is desired to remove a majority of non-nodules. The score with the highest frequency in the histogram is most likely to indicate a representative of the majority of non-nodules. Thus, the training non-nodule images may be selected on the basis of the histogram.

Figure 2C:
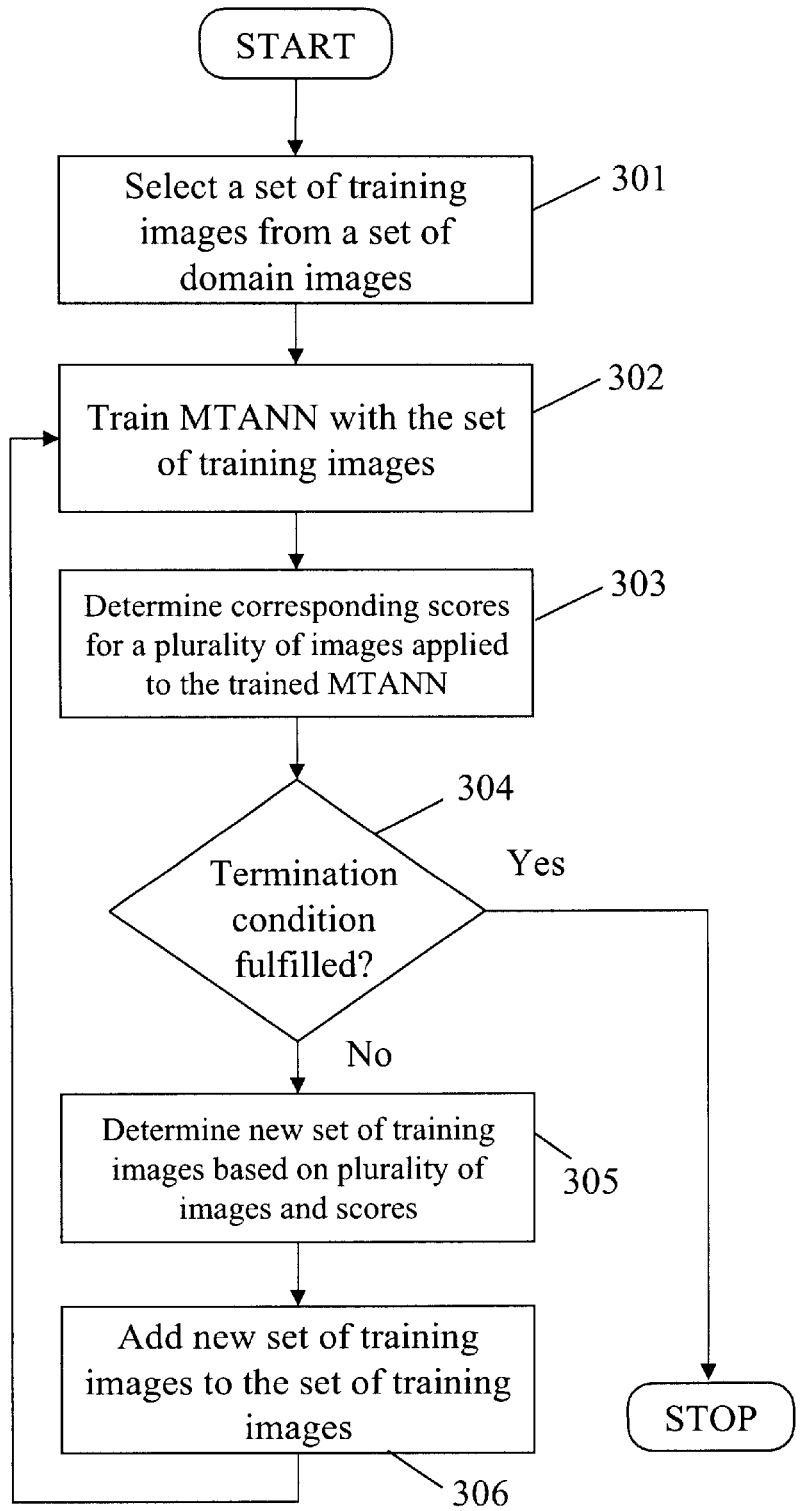

FIG. 2C illustrates a second embodiment of the present invention in which steps 301–303 are the same as described above with regard to FIG. 2B. However, in step 304, an inquiry is made whether a termination condition is satisfied. For example, if the MTANN performance scores indicate a decrease in performance, the method ends. Another termination condition may be that the size of the training set has reached a predetermined size, e.g., 14 images. Otherwise, a new set of training images (e.g., a second pair of images) is selected in step 305, as described above. In step 306, the second selected pair of the nodule and non-nodule images is added to the training set.

Next, steps 302–304 are repeated. In step 302, the MTANN is trained with the new training set including the seed pair and the second pair (i.e., it includes two nodules and two non-nodules). The selection of the third pair of a nodule and a non-nodule, and the subsequent training with the third training set in which the selected pair is added, are continued in the same way as the second training. These steps are repeated until the performance of the MTANN decreases, which is determined in step 304. The performance of the MTANN is expected to increase until the variation of the training samples exceeds the capacity of the MTANN.

Figure 2D:
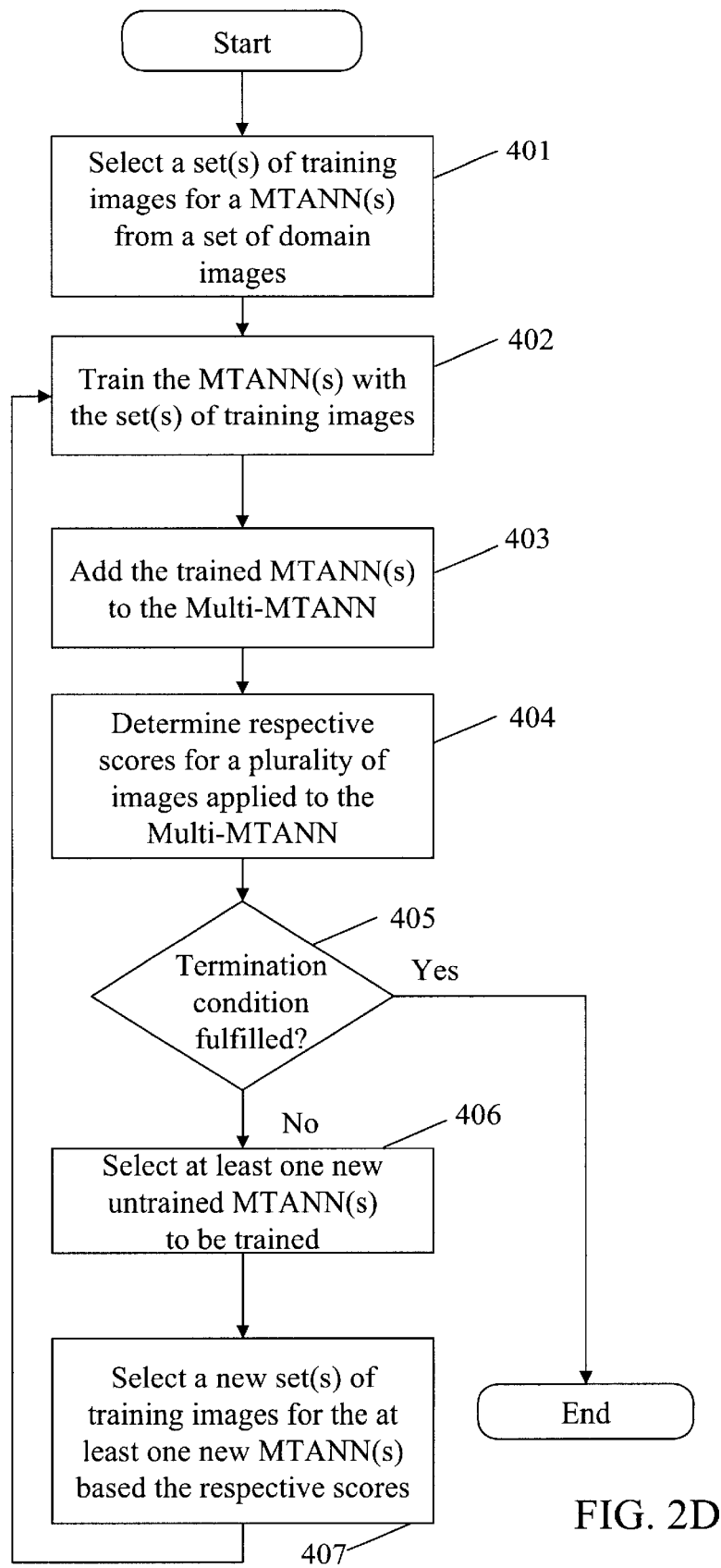
FIG. 2D illustrates the method of selecting training images for a plurality of MTANNs in a Multi-MTANN according to the present invention.

FIG. 2D illustrates the method of selecting training images for a Multi-MTANN (e.g., shown in FIG. 10) according to the present invention. In step 401, a set of training images is selected for at least one MTANN in the Multi-MTANN using the methods shown, for example, in FIGS. 2B and 2C. Note that for each MTANN, the non-abnormality training images may be selected, e.g., from those images in the image database 150 belonging to the particular type of normal (non-abnormality) images that the first MTANN is being trained to distinguish, as discussed above. However, this is not required.

In step 402, the selected at least one MTANNs are trained with the set of training images. In step 403, the trained at least one MTANNs are added/connected to existing structure of the Multi-MTANN.

In step 404, a plurality of images from the image database 150 are applied to the Multi-MTANN and a corresponding plurality of scores are calculated. In step 405, an inquiry is made whether a termination condition is satisfied, e.g., all of the MTANNs have been added to the Multi-MTANN. If the answer to the inquiry is YES, the process terminates. Otherwise, the process continues to step 406.

In step 406, at least one new, untrained MTANN is selected to be trained. In step 407, a new set of training images is selected for the at least one new MTANNs based on the existing set of training images and the scores calculated in step 404. In particular, the abnormality images in the set of training images are retained. However, other non-abnormality images may be selected based on, e.g., the particular type of normal (non-abnormality) images that the first MTANN is being trained to distinguish. In one embodiment, the non-abnormality image having the median score at a classification sensitivity of 100% is selected. In addition, depending on the number of images in the original set of training images, additional non-abnormality images having scores close to the middle score are selected. For example, if five pairs of images are in the set of training images, the non-abnormality images $T_{n-2}$, $T_{n-1}$, $T_n$, $T_{n+1}$, and $T_{n,+2}$ are selected, with $T_n$ being the image having the median score. Note that several sets of training images may be selected simultaneously, and several single-MTANNs may be trained with the sets simultaneously. In this case, sets of non-nodules are selected at certain score intervals. For example, when five sets of training images are to be obtained, the entire range of scores (e.g., 600 scores) is divided into six even intervals (e.g., each interval includes 100 scores). A first set of non-nodules is then selected around the score having the first interval point (e.g., 100th ranking in the scores).

After step 407, steps 402–405 are repeated.

LDCT Lung Cancer Study

The method of the present invention was tested in a study of a set of LDCT scans used in the detection of lung cancer. The image database used in this study consisted of 101 non-infused LDCT scans acquired from 71 patients who participated voluntarily in a lung cancer screening program between 1996 and 1998 in Nagano, Japan [2][5]. The CT examinations were performed on a mobile CT scanner (CT-W950SR; Hitachi Medical, Tokyo, Japan). The scans used for this study were acquired with a low-dose protocol of 120 kVp, 25 mA (54 scans) or 50 mA (47 scans), 10-mm collimation, and a 10-mm reconstruction interval at a helical pitch of two. The pixel size was 0.586 mm for 83 scans and 0.684 mm for 18 scans. Each reconstructed CT section had an image matrix size of 512×512 pixels. Since cancers in some of the patients missed at multiple screening studies, the database included scans from the same patients at different times. Each occurrence of cancers in the database was considered a separate cancer for the purpose of this study. The 101 scans consisted of 2,822 sections, and contained 121 nodules including 104 nodules representing biopsy-confirmed primary cancers (74 cancers). The nodule size in the database ranged from 4 to 27 mm. Thirty-eight of the 101 LDCT scans were used as a design set for designing the MTANN. The 38 scans consisted of 1,057 sections and contained 50 nodules, including 38 nodules representing confirmed cancers that had been "missed" by radiologists [5].

Technical details of a previously reported CAD methodology have been published previously [11–14]. To summarize that methodology, lung nodule identification proceeds in three phases: automated lung segmentation based on a gray-level-thresholding technique, followed by the multiple gray-level-thresholding technique, and then the application of rule-based and linear discriminant classifiers. Using the previously reported CAD scheme, a sensitivity of 80.0% (40/50 nodules) together with 1,078 (1.02 per section) false positives was achieved for the design set [14]. When applied to the entire database, the previously reported CAD method achieved a sensitivity of 81.0% (98/121 nodules) with 0.99 false positives per section (2,804/2,822). In this study, all 121 nodules, the locations of which were identified by an experienced chest radiologist, and all 2,804 false positives generated by the CAD scheme were used. The use of radiologist-extracted nodules with computer-generated false positives in this study was intended to anticipate future improvements in the nodule detection sensitivity of the CAD scheme.

Figure 3:
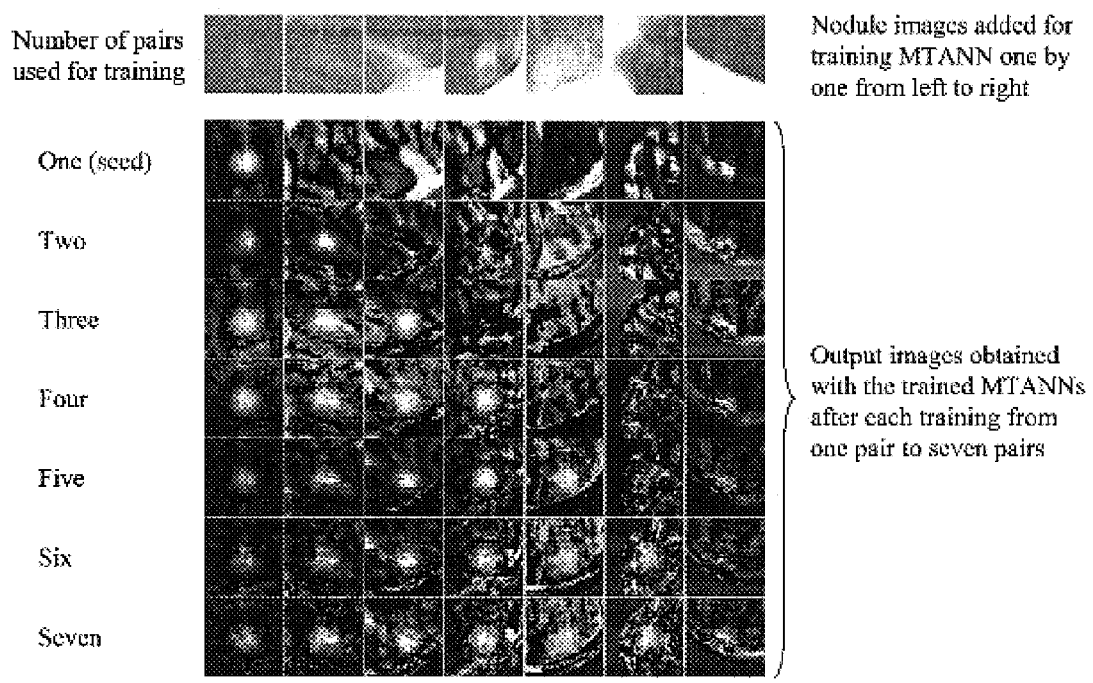
FIG. 3 illustrates seven nodules (top row) used for training MTANNs and the output images obtained from the MTANNs trained separately with seven different numbers of samples, in which the first nodule in the top row was used for training the MTANN with the seed pair, the first and the second nodules in the top row were used for training the MTANN with the two pairs, etc.
Figure 4:
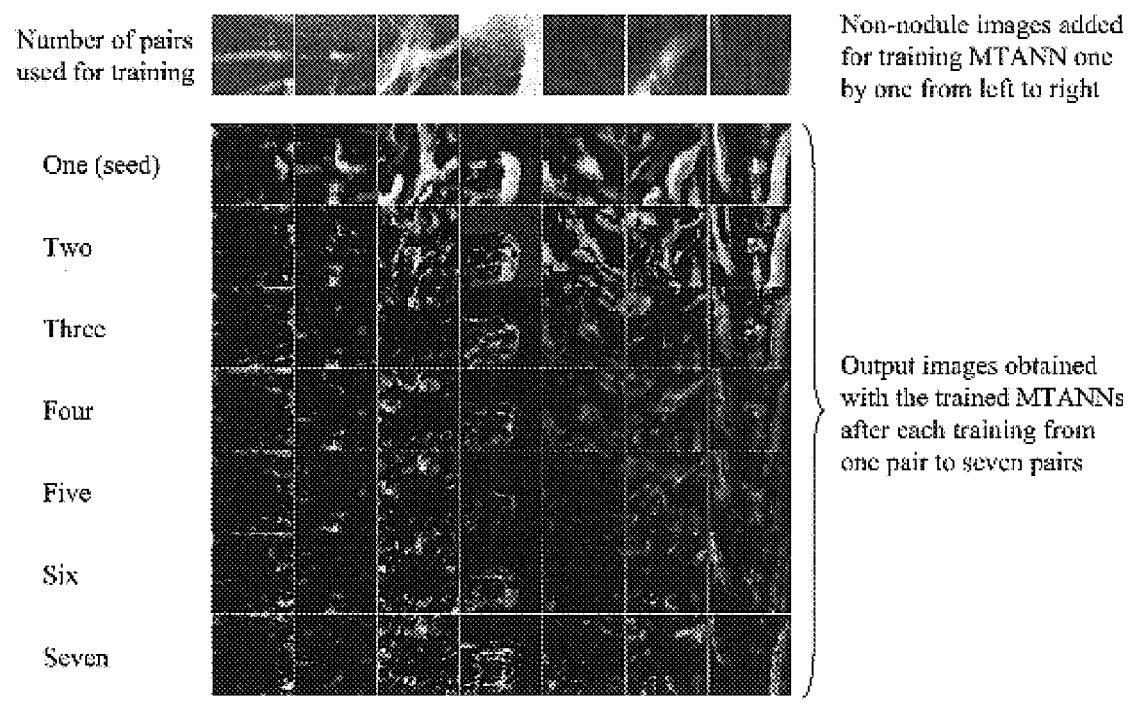
FIG. 4 illustrates seven non-nodules (top row) used for training MTANNs and the output images obtained from the MTANNs trained separately with seven different numbers of samples, in which the first non-nodule in the top row was used for training the MTANN with the seed pair, the first and the second non-nodules in the top row were used for training the MTANN with the two pairs, etc.

Fifty nodules and 1,078 false positives (non-nodules) were used. A typical nodule (pure ground-glass opacity; pure GGO) and a typical non-nodule (a medium-sized vessel with relatively high contrast) were selected as the seed pair. The seed pair (a region of 40 by 40 pixels is displayed as an example) is shown in FIGS. 3 and 4 (1st ROI in the top row). A three-layer structure was employed as the structure of the modified multilayer ANN, because any continuous mapping can be approximately realized by three-layer ANNs [33] [34]. The parameters such as the size of the local window RS of an MTANN, the standard deviation σT of the two-dimensional Gaussian function for the teacher image, and the size of the training region RT in the teacher image were determined empirically as nine by nine pixels, 5.0 pixels, and 19 by 19 pixels, respectively. The number of units in the hidden layer was set at 25. Thus, the numbers of units in the input, hidden, and output layers were 81, 25, and one, respectively. With the parameters above, the training of the MTANN was performed on 500,000 epochs-one epoch means one training run for one training data set-and converged with a mean absolute error of 6.3%. The training took CPU time of 3.0 hours on a PC-based workstation (CPU: Pentium IV, 1.7 GHz), and the time for applying the trained MTANN to nodule candidates was negligibly small.

Figure 5:
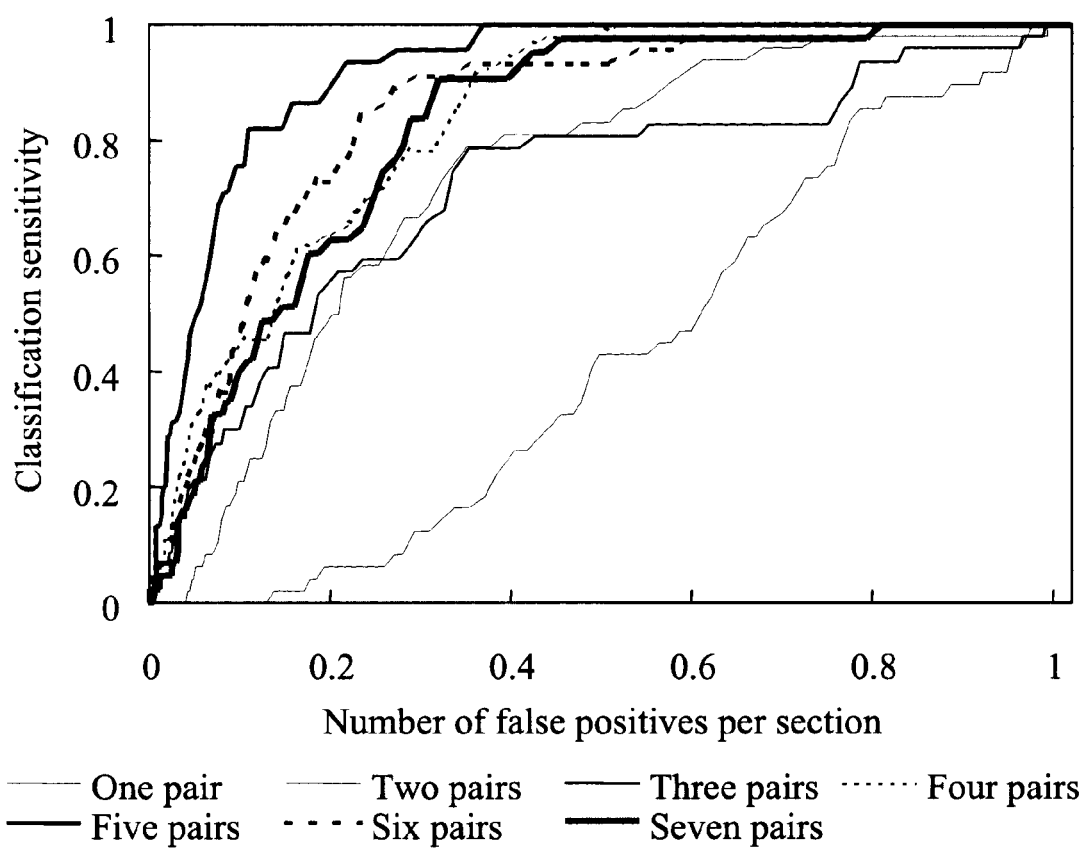
FIG. 5 shows FROC curves of the MTANNs trained with seven different pairs of training samples for non-training nodules and non-nodules in the design set.

The results of applying the trained MTANN to the seed pair are shown in FIGS. 3 and 4 (1st ROI in the 2nd row). Before the trained MTANN was applied, pixels outside the segmented lung regions disclosed by the previously reported CAD scheme were set to −1000 HU. The nodule in the output image of the MTANN is represented by light distributions near the center, whereas the output image for the non-nodule is almost uniformly dark. The trained MTANN was applied to non-training cases including 49 nodules and 1,077 non-nodules. The scoring method was applied to the output images of the trained MTANN. The standard deviation of the Gaussian function for scoring was determined empirically as σ=3.7. An RE of 25 by 25 pixels was used. The performance of the trained MTANN was evaluated by FROC curves, as shown in FIG. 5. The FROC curve expresses the classification sensitivity as a function of the number of false positives per section at a specific operating point, which is determined by a threshold θ.

Figure 6:
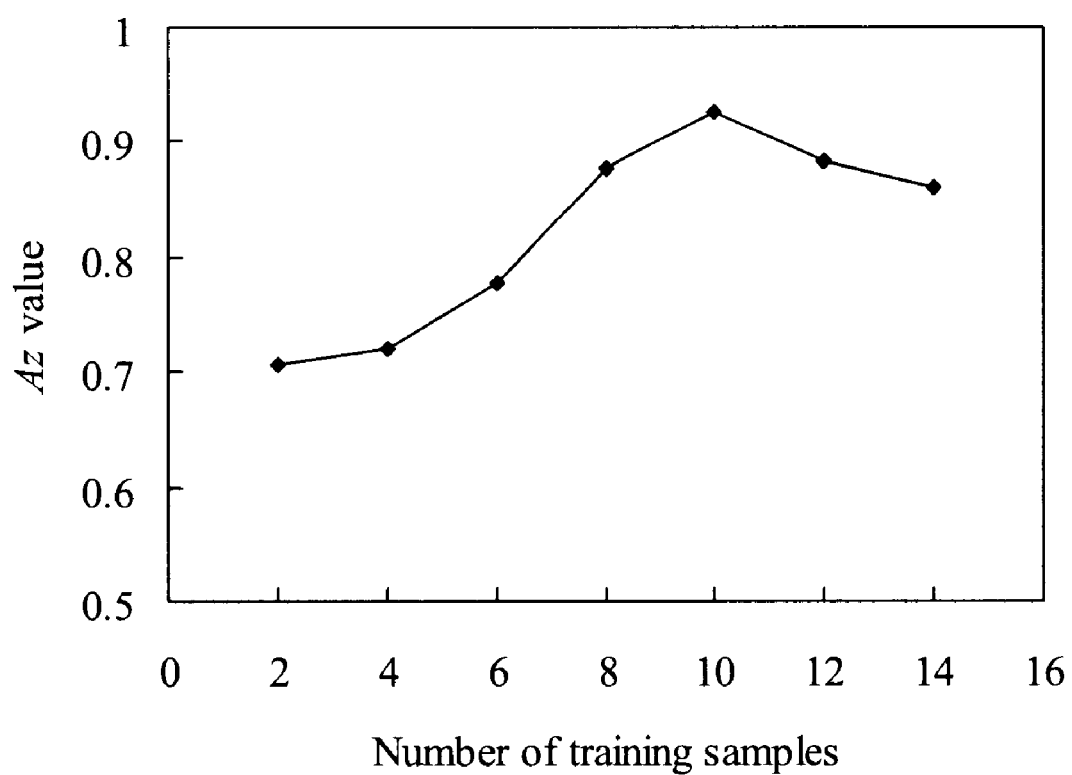
FIG. 6 illustrates the performance of MTANNs trained with different numbers of training samples.

When the threshold θ was determined so as not to eliminate any nodules (i.e., a classification sensitivity of 100%) but to remove as many non-nodules as possible, 23 false positives (non-nodules) could be removed (i.e., 1,054 non-nodules remained). The nodule with the lowest score of all 49 non-training nodules was selected as the second training nodule, as shown in FIG. 3 (The second nodule in the top row). The non-nodule with the middle ranking in the scores for all remaining 1,054 non-nodules was selected as the second training non-nodule, as shown in FIG. 4. (The second non-nodule in the top row.) The second pair of a nodule and a non-nodule was added in the training set. Then, an MTANN was trained with the training set containing two nodules and two non-nodules by use of the same parameters as the MTANN was trained with the seed pair. The output images of the trained MTANN with two pairs of training samples are shown in FIGS. 3 and 4. The trained MTANN was applied to non-training cases including 48 nodules and 1076 non-nodules. The FROC curve of the trained MTANN No. 2 is shown in FIG. 5. These procedures, including the selection of a training pair and the training, were repeated seven times. The training sets of nodules and non-nodules for MTANNs, and the output images of the trained MTANNs, are shown in FIGS. 3 and 4. The FROC curves of the trained MTANN with seven different pairs of training samples are shown in FIG. 5. FIG. 6 shows the performance of each MTANN, which was evaluated by use of receiver operating characteristic (ROC) analysis [35][36]. The performance of the MTANN was improved until the number of training samples increased to ten (five nodules and five non-nodules).

Figure 7:
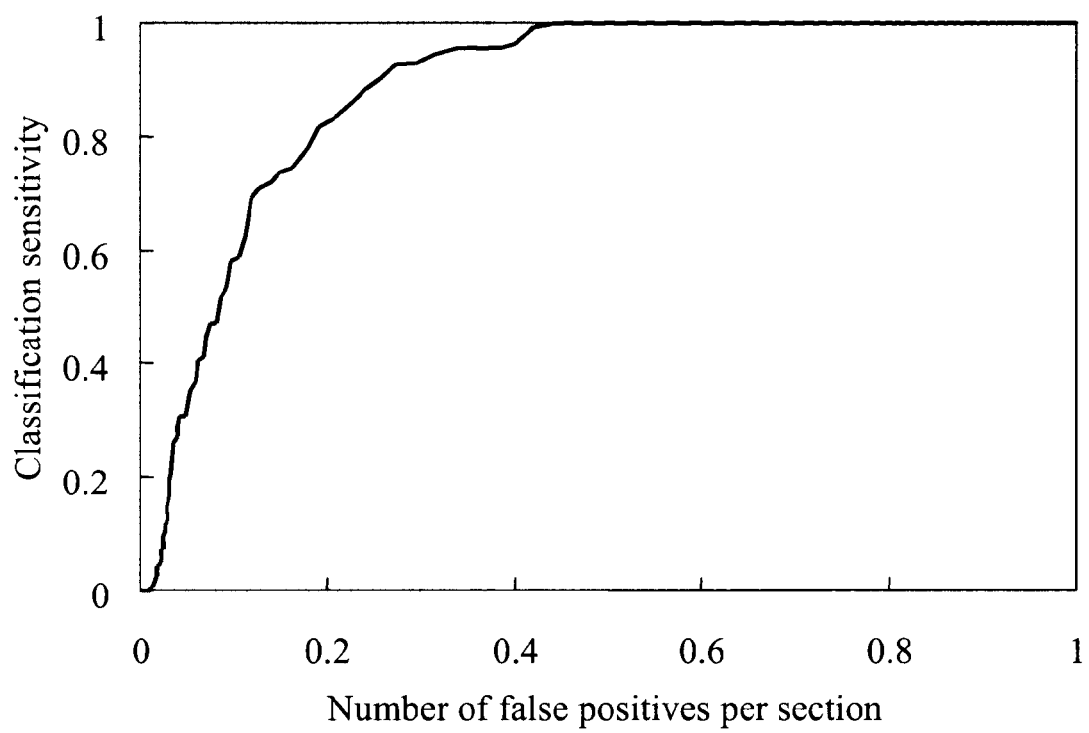
FIG. 7 illustrates the performance of the MTANN trained with five nodules and five non-nodules, for the evaluation of 116 nodules including 99 nodules representing confirmed primary cancers and 2,799 false positives (non-nodules) in a validation test, wherein the FROC curve of the MTANN indicates a classification sensitivity of 100% and a reduction in the false-positive rate from 0.99 to 0.44 per section.

In order to investigate the generalization ability, the MTANN trained with five pairs of training samples was applied to the entire database from which the training set of five nodules and five non-nodules was excluded, which contained 116 nodules including 99 primary cancers and 2,799 false positives (non-nodules); the FROC curve of the MTANN in a validation test is shown in FIG. 7. By using the MTANN, 55.8% (1,561/2,799) of false positives were removed without a reduction in the number of true positives, i.e., a classification sensitivity of 100%.

The effect of other methods for selecting the second pair of training samples was examined. The starting set consisted of the 1,054 remaining non-nodules at a classification sensitivity of 100% after the MTANN trained with the seed pair was applied. The second pair of a nodule and a non-nodule was determined by three different methods. First, the nodule with the lowest score of all 49 non-training nodules was used as the second training nodule; the non-nodule with the highest score of all remaining non-nodules was selected as the second training non-nodule. Second, the nodule with the lowest score of all 49 non-training nodules was used as the second training nodule; the non-nodule with the lowest score of all remaining non-nodules was selected as the second training non-nodule. Third, the nodule with the middle ranking in the scores for all 49 non-training nodules was selected as the second training nodule; the non-nodule with the middle ranking in the scores for all 1,054 remaining non-nodules was selected as the second training non-nodule. Each pair of a nodule and a non-nodule was added in the training set. The MTANNs were trained by use of the training set that was obtained by the above three methods (hereinafter referred to as Two pairs (1), Two pairs (2), and Two pairs (3), respectively).

Figure 8:
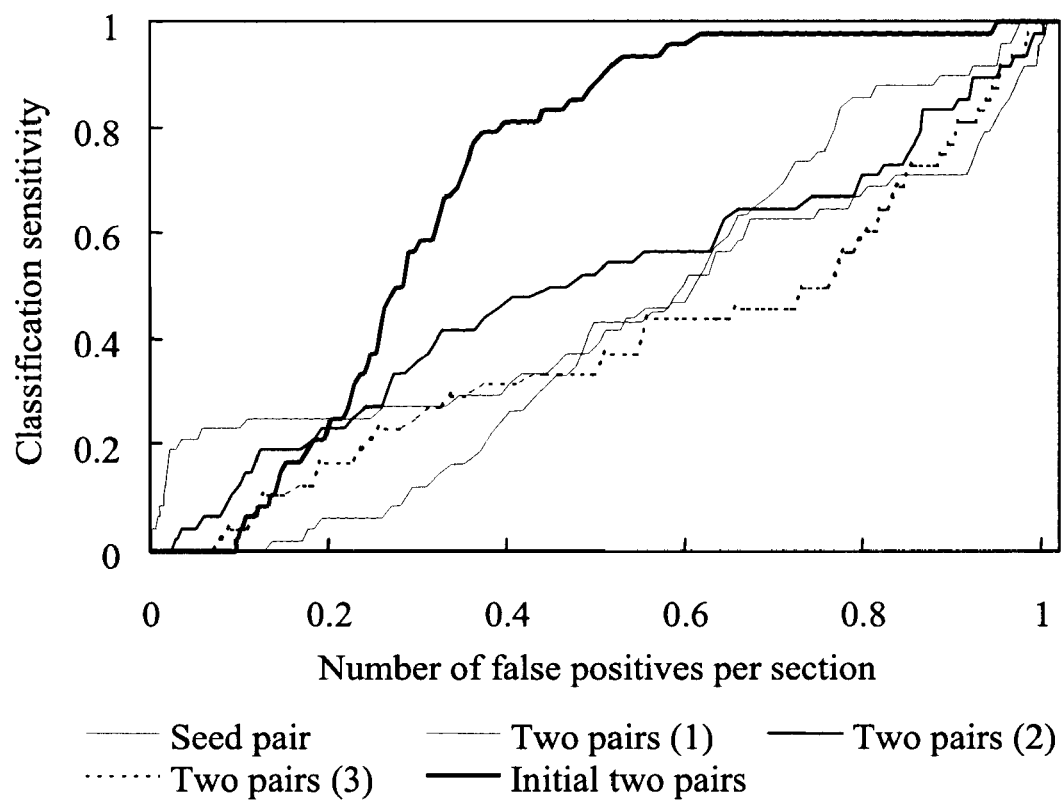
FIG. 8 illustrates FROC curves of MTANNs trained with different nodules and non-nodules, which were determined using four different training samples.

FIG. 8 shows the FROC curves of the trained MTANNs. The performance of the MTANN trained with two pairs in FIGS. 3 and 4 was the highest of all. Because the training non-nodule in the two pairs (1) can be considered as a "difficult non-nodule," it contributed to the improvement in the performance at low false-positive rates. Because the training non-nodule in the two pairs (2) can be considered as an "easy non-nodule" similar to the seed non-nodule, it did not contribute as much to the improvement in the performance. The training nodule in the two pairs (3) contributed to the improvement of the performance at medium to low false-positive rates.

Figure 9:
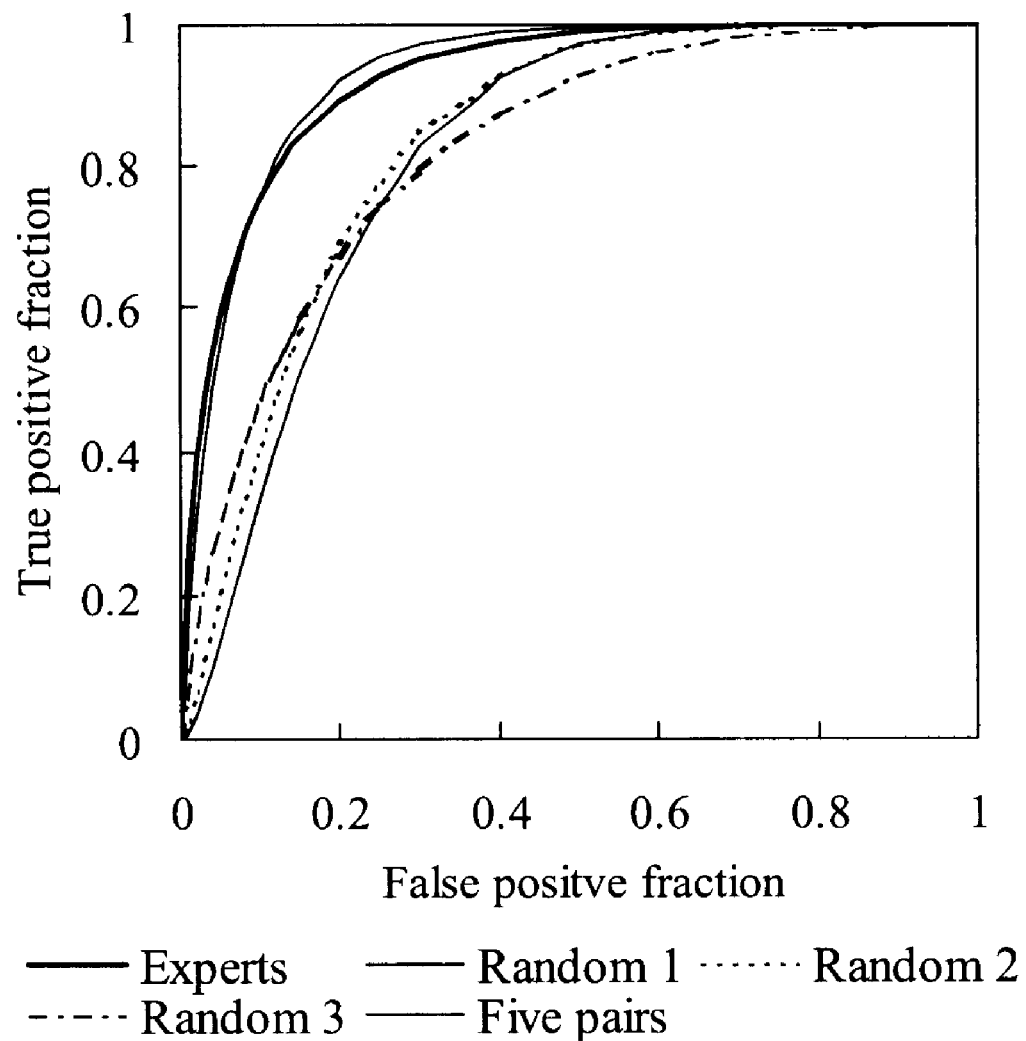
FIG. 9 illustrates ROC curves of the MTANN trained with the training samples selected by experts, three MTANNs trained with randomly selected training nodules, and the MTANN trained with five pairs of training samples.

Furthermore, alternative methods of selecting the training samples were examined. One physicist selected ten typical nodules as training samples from the three categories (pure GGO, mixed GGO, and solid nodule) determined by three radiologists based on the visual appearance of these patterns. An experienced chest radiologist classified the false positives reported by the current CAD scheme into four major groups, such as small (including peripheral) vessels (40% of false positives), medium-sized vessels (30%), soft-tissue opacities including opacities caused by the partial volume effect between the lung region and the diaphragm (20%), and part of normal structures in the mediastinum, including large vessels in the hilum (10%). Because small (including peripheral) vessels were included in the medium-sized vessel images, medium-sized vessels were selected as the group used for training samples. The radiologist selected ten vessels with relatively high contrast from the group of the medium-sized vessels, because they are dominant over all medium-sized vessels. The MTANN was trained with these ten nodules and ten non-nodules. The performance of the trained MTANN 15 for non-training cases was similar to that of the MTANN trained with five pairs of training samples, as shown in FIG. 9. Furthermore, ten training nodules were changed by use of a random selection from 50 nodules in the design set. Three sets of ten nodules were selected randomly. Three MTANNs were trained with different training nodules and the same non-nodules. The performance of the three trained MTANNs was lower than that of the MTANN trained with the five pairs above and the MTANN trained with the training samples selected by experts.

An ANN requires training with a large number of cases because the ANN has a number of parameters (weights). The inputs of the ANN may often be the image features, which would include, in general, some noise due to the fluctuation in the feature extraction. The teacher signal may often be a class such as a nodule or a non-nodule, which would tend to force the discriminant boundary between nodules and non-nodules to be too steep, which would lead to a lower performance for non-training cases. The MTANN was able to be trained with a small number of training samples using the method of the present invention. The key to this high generalization ability might be the division of one nodule image into a large number of sub-regions. Note that the distinction between nodules and non-nodules was treated as an image-processing task, i.e., as a highly nonlinear filter that performs both nodule enhancement and non-nodule suppression. This allows the training of the MTANN not on a case-by-case basis, but on a sub-region basis. Thus, massive training with a large number of sub-regions contributes to the proper determination of the parameters. Moreover, direct use of pixel values instead of image features as the inputs keeps one from mixing the input information with the noise due to the fluctuation in the feature extraction. In addition, the use of the likelihood of being a nodule helps to determine a discriminant boundary that is much smoother.

In summary, by use of the MTANN trained with a small number of training samples (n=10), i.e., five pairs of nodules and non-nodules, the false-positive rate of the previously reported CAD scheme was reduced from 0.99 to 0.44 false positive per section, while the current sensitivity (81.0%) was maintained. Thus, the MTANN training using the method of the present invention is useful for false positive reduction in the computerized detection of lung nodules in LDCT.

The inventive system conveniently may be implemented using a conventional general purpose computer or microprocessor programmed according to the teachings of the present invention, as will be apparent to those skilled in the computer art. Appropriate software can readily be prepared by programmers of ordinary skill based on the teachings of the present disclosure, as will be apparent to those skilled in the software art.

In a particular preferred embodiment, the artificial neural network was programmed in software using the C programming language on a Linux based machine. Of course, other suitable programming languages operating with other available operating systems may be chosen to implement the invention.

A general purpose computer may implement the method of the present invention, wherein the computer housing houses a motherboard which contains a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other optical special purpose logic devices such as ASICs (application specific integrated circuits) or configurable logic devices such GAL (generic array logic) and reprogrammable FPGAs (field programmable gate arrays).

The computer may also include plural input devices, (e.g., keyboard and mouse), and a display card for controlling a monitor. Additionally, the computer may include a floppy disk drive; other removable media devices (e.g. compact disc, tape, and removable magneto optical media); and a hard disk or other fixed high density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

As stated above, the system includes at least one computer readable medium. Examples of computer readable media include compact discs, hard disks, floppy disks, tape, magneto optical disks, PROMs (e.g., EPROM, EEPROM, Flash EPROM), DRAM, SRAM, SDRAM, etc. Stored on any one or on a combination of computer readable media, the present invention includes software for controlling both the hardware of the computer and for enabling the computer to interact with a human user. Such software may include, but is not limited to, device drivers, operating systems and user applications, such as development tools.

Such computer readable media further includes the computer program product of the present invention for performing the inventive method herein disclosed. The computer code devices of the present invention can be any interpreted or executable code mechanism, including but not limited to, scripts, interpreters, dynamic link libraries, Java classes, and complete executable programs.

Moreover, parts of the processing of the present invention may be distributed for better performance, reliability, and/or cost. For example, an outline or image may be selected on a first computer and sent to a second computer for remote diagnosis.

The invention may also be implemented by the preparation of application specific integrated circuits (ASICs) or by interconnecting an appropriate network of conventional component circuits, as will be readily apparent to those skilled in the art.

The invention is embodied in trained artificial neural networks, in arrangements for training such artificial neural networks, and in systems including both the network portion and the training portions. Of course, the invention provides methods of training and methods of execution. Moreover, the invention provides computer program products storing program instructions for execution on a computer system, which when executed by the computer system, cause the computer system to perform the methods described herein.

The invention may be applied to virtually any field in which a target pattern must be distinguished from other patterns in image(s). The MTANN distinguishes target objects (or areas) from others by using pattern (feature) differences: artificial neural networks, trained as described above, can detect target objects (or areas) that humans might intuitively recognize at a glance. For example, the invention may be applied to these fields, in addition to the medical imaging application that is described above: detection of other vehicles, white line lane markers, traffic signals, pedestrians, and other obstacles in road images; detection of eyes, mouths, and noses in facial images; detection of fingerprints in "dust" images; detection of faulty wiring in semiconductor integrated circuit pattern images; detection of mechanical parts in robotic eye images; detection of guns, knives, box cutters, or other weapons or prohibited items in X-ray images of baggage; detection of airplane shadows, submarine shadows, schools of fish, and other objects, in radar or sonar images; detection of missiles, missile launchers, tanks, personnel carriers, or other potential military targets, in military images; detection of weather pattern structures such as rain clouds, thunderstorms, incipient tornadoes or hurricanes, and the like, in satellite and radar images; detection of areas of vegetation from satellite or high altitude aircraft images; detection of patterns in woven fabrics, for example, using texture analysis; detection of seismic or geologic patterns, for use in oil or mineral prospecting; and detection of stars, nebulae, galaxies, and other cosmic structures in telescope images.

The various applications of detection, exemplified in the list above, can be succeeded by a distinction of one specific target structure from another specific structure, once they have been detected. For example, after a fingerprint is detected in a "dust" image, the detected fingerprint can be compared to suspects' fingerprints to verify or disprove the identify of the person leaving the detected fingerprint.

More generally, the inventive MTANN can identify target objects (or areas) in images, if there are specific patterns (or features) that represent those objects or areas. The patterns or features may include: texture, average gray level, spatial frequency, orientation, scale, shape, etc. Thus, it is seen that the functionality and applicability of the inventive MTANN extends far beyond analysis of medical images.

Numerous modifications and variations of the present invention are possible in light of the above teachings. For example, the invention may be applied to images other than low-dose CT lung images. Further, the particular architecture of the artificial neural network, the particular filtering of the output of the artificial neural network, the particular likelihood distribution used in a training teacher image, and the particular training images, may be varied without departing from the scope of the invention. Of course, the particular hardware or software implementation of the invention may be varied while still remaining within the scope of the present invention. It is therefore to be understood that within the scope of the appended claims and their equivalents, the invention may be practiced otherwise than as specifically described herein.

We claim:

1. A method of selecting an operational set of training images for a massive training artificial neural network (MTANN), the MTANN configured to output an indication of an abnormality in a test image, comprising:

selecting a prospective set of training images from a set of domain images;

training the MTANN with the prospective set of training images;

applying a plurality of images from the set of domain images to the trained MTANN to obtain respective scores for the plurality of images; and determining the operational set of training images based on the applied plurality of images and the respective scores.

2. The method of claim 1, wherein the determining step comprises:

selecting a plurality of additional training images from the applied plurality of images based on the respective scores; and adding the plurality of additional training images to the prospective set of training images to obtain the operational set of training images.

3. The method of claim 2, wherein the step of selecting the plurality of additional training images comprises:

determining a set of abnormality images and a corresponding set of abnormality scores based on the applied plurality of images and the respective scores;

selecting, from the set of abnormality images, an abnormality image having a minimal score in the corresponding set of abnormality scores;

determining a set of non-abnormality images and a corresponding set of non-abnormality scores based on the applied plurality of images and the respective scores, wherein each image in the set of non-abnormality images has a corresponding score greater than the minimal score in the corresponding set of abnormality scores;

selecting, from the set of non-abnormality images, a non-abnormality image having a median score in the corresponding set of non-abnormality scores; and selecting the abnormality image and the non-abnormality image as the plurality of additional training images.

4. The method of claim 1, further comprising:

calculating a performance measure of the MTANN based on the applied plurality of images and the respective scores;

setting the prospective set of training images to be the operational set of training images; and repeating the training, applying, determining, calculating, and setting steps until the performance measure of the MTANN decreases.

5. The method of claim 1, wherein the selecting step comprises:

including an abnormality image and a non-abnormality image in the prospective set of training images.

6. The method of claim 1, wherein the selecting step comprises:

selecting, from a set of low-dose computed-tomographic (LDCT) images, an image including a lung nodule and an image not including a lung nodule, as the prospective set of training images.

7. The method of claim 1, wherein the determining step comprises:

selecting a plurality of additional training images from the applied plurality of images based on a histogram analysis of the respective scores; and adding the plurality of additional training images to the prospective set of training images to obtain the operational set of training images.

8. A method of selecting training images for a plurality of MTANNs comprising a Multi-MTANN, wherein each MTANN in the Multi-MTANN is configured to output an indication of an abnormality in the test image and the output of each of the plurality of MTANNs is combined to form a combined indication of the abnormality in the test image, the method comprising:

selecting a set of training images for a selected MTANN in the Multi-MTANN using the method of claim 1;

training the selected MTANN with the selected set of training images;

activating the trained MTANN within the Multi-MTANN;

applying a plurality of images from the set of domain images to the Multi-MTANN to obtain respective scores;

selecting a second set of training images for a second selected MTANN in the Multi-MTANN based on the applied plurality of images and the respective scores; and repeating the previous training, activating, applying, and selecting steps until a predetermined condition is satisfied.

9. The method of claim 8, wherein the step of selecting the second set of training images comprises:

including at least one abnormality image from the selected set of training images in the second set of training images; and selecting at least one non-abnormality image from the applied plurality of images based on the respective scores.

10. The method of claim 9, wherein the step of selecting at least one abnormality image comprises:

selecting, from the applied plurality of images, an abnormality image belonging to a particular class of non-abnormality images.

11. A system configured to select a set of training images for the MTANN by performing the steps recited in any one of claims 1–10.

12. A computer program product configured to store plural computer program instructions which, when executed by a computer, cause the computer perform the steps recited in any one of claims 1–10.

* * * * *